United States Patent
Tanaka et al.

(10) Patent No.: US 12,322,300 B2
(45) Date of Patent: Jun. 3, 2025

(54) INFORMATION PROCESSING SYSTEM AND COMPUTER SYSTEM IMPLEMENTED METHOD OF PROCESSING INFORMATION

(71) Applicant: YAMAHA CORPORATION, Hamamatsu (JP)

(72) Inventors: Kenichi Tanaka, Hamamatsu (JP); Yoshimasa Isozaki, Hamamatsu (JP); Haruki Ohkawa, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 267 days.

(21) Appl. No.: 18/187,336

(22) Filed: Mar. 21, 2023

(65) Prior Publication Data

US 2023/0326357 A1  Oct. 12, 2023

(30) Foreign Application Priority Data

Apr. 6, 2022 (JP) ................... 2022-063427

(51) Int. Cl.
 *G09B 5/02* (2006.01)
 *G09B 15/00* (2006.01)
 *G10G 1/02* (2006.01)
 *G10H 1/00* (2006.01)

(52) U.S. Cl.
 CPC ............ *G09B 5/02* (2013.01); *G09B 15/00* (2013.01); *G10G 1/02* (2013.01); *G10H 1/0008* (2013.01); *G10H 2210/091* (2013.01); *G10H 2210/385* (2013.01); *G10H 2220/091* (2013.01); *G10H 2220/455* (2013.01)

(58) Field of Classification Search
 CPC . G09B 5/02; G09B 15/00; G10G 1/02; G10H 1/0008; G10H 2220/091; G10H 2220/455
 See application file for complete search history.

(56) References Cited

U.S. PATENT DOCUMENTS

| | | | |
|---|---|---|---|
| 5,082,258 A * | 1/1992 | Niks | A63B 23/16 601/40 |
| 5,392,682 A * | 2/1995 | McCartney-Hoy | G09B 15/003 84/478 |
| 6,982,375 B2 * | 1/2006 | McGregor | G09B 15/06 84/478 |

(Continued)

FOREIGN PATENT DOCUMENTS

| | | | | |
|---|---|---|---|---|
| JP | 2019179062 A | * | 10/2019 | B41J 2/03 |
| JP | 2023053619 A | * | 4/2023 | |
| WO | WO-2021157691 A1 | * | 8/2021 | G06T 7/246 |

*Primary Examiner* — Robert W Horn
(74) *Attorney, Agent, or Firm* — ROSSI, KIMMS & McDOWELL LLP

(57) ABSTRACT

An information processing system includes an image obtaining circuit and a display control circuit. The image obtaining circuit is configured to obtain observation images of a first keyboard of a first keyboard instrument. The display control circuit is configured to display, on a display device, the observation images and reference images. The reference images include moving images of at least one hand and one or more fingers of a reference performer who is playing a second keyboard of a second keyboard instrument. The at least one hand and the one or more fingers of the reference performer are displayed overlapping the first keyboard included in the observation images.

20 Claims, 12 Drawing Sheets

(56) References Cited

U.S. PATENT DOCUMENTS

| | | | | |
|---|---|---|---|---|
| 8,895,829 | B2* | 11/2014 | Soejima | G09B 15/00 84/467 |
| 11,996,070 | B1* | 5/2024 | Helms | G10H 1/0016 |
| 2004/0244564 | A1* | 12/2004 | McGregor | G09B 15/023 84/478 |
| 2005/0204908 | A1* | 9/2005 | Uehara | G10G 1/02 84/746 |
| 2006/0137511 | A1* | 6/2006 | McGregor | G09B 15/023 84/478 |
| 2009/0173212 | A1* | 7/2009 | Wold | G09B 15/02 84/483.2 |
| 2012/0167747 | A1* | 7/2012 | Luchinskiy | G09B 15/008 84/485 R |
| 2017/0358235 | A1* | 12/2017 | Daniels | G09B 5/065 |
| 2021/0104169 | A1* | 4/2021 | Si | G06T 11/00 |
| 2023/0326357 | A1* | 10/2023 | Tanaka | G10H 1/0016 84/465 |

* cited by examiner

INFORMATION PROCESSING SYSTEM AND COMPUTER SYSTEM IMPLEMENTED METHOD OF PROCESSING INFORMATION

CROSS-REFERENCE TO RELATED APPLICATIONS

The present application claims priority under 35 U.S.C. § 119 to Japanese Patent Application No. 2022-063427, filed Apr. 6, 2022. The contents of this application are incorporated herein by reference in their entirety.

BACKGROUND

Field

The present disclosure relates to an information processing system and a computer system implemented method of processing information.

Background Art

WO/2021/157691 discloses a technique of assisting a user to play a musical instrument such as a keyboard instrument. Specifically, WO/2021/157691 discloses: analyzing an image of hands and fingers of the user who is playing a keyboard instrument; and generating time-series information estimating postures of the hands and fingers.

When a person practices playing a keyboard instrument, a preferable situation is that a trainer is present near the person. It is, however, difficult for a trainer to be continually present near the person in actual situations. While the foregoing description is under the assumption that a person practices playing a keyboard instrument, similar issues are seen in four or more handed performance of musical instruments such as a keyboard instrument by a plurality of users. The present disclosure has been made in view of the above-described and other problems, and has an object to provide a technique that enables a performer to play a keyboard instrument while looking at performance of another performer.

SUMMARY

One aspect is an information processing system that includes an image obtaining circuit and a display control circuit. The image obtaining circuit is configured to obtain observation images of a first keyboard of a first keyboard instrument. The display control circuit is configured to display, on a display device, the observation images and reference images. The reference images include moving images of at least one hand and one or more fingers of a reference performer who is playing a second keyboard of a second keyboard instrument. The at least one hand and the one or more fingers of the reference performer are displayed overlapping the first keyboard included in the observation images.

Another aspect is a computer system implemented method of processing information. The method includes obtaining observation images of a first keyboard of a first keyboard instrument. The method also includes displaying, on a display device, the observation images and reference images, the reference images including a moving image of at least one hand and one or more fingers of a reference performer who is playing a second keyboard of a second keyboard instrument, such that the at least one hand and the one or more fingers of the reference performer are displayed overlapping the first keyboard included in the observation images.

BRIEF DESCRIPTION OF THE DRAWINGS

A more complete appreciation of the present disclosure and many of the attendant advantages thereof will be readily obtained as the same becomes better understood by reference to the following detailed description when considered in connection with the following figures.

DESCRIPTION OF THE EMBODIMENTS

The present development is applicable to an information processing system, a computer system implemented method of processing information, and a non-transitory computer-readable recording medium.

A: First Embodiment

Figure 1:
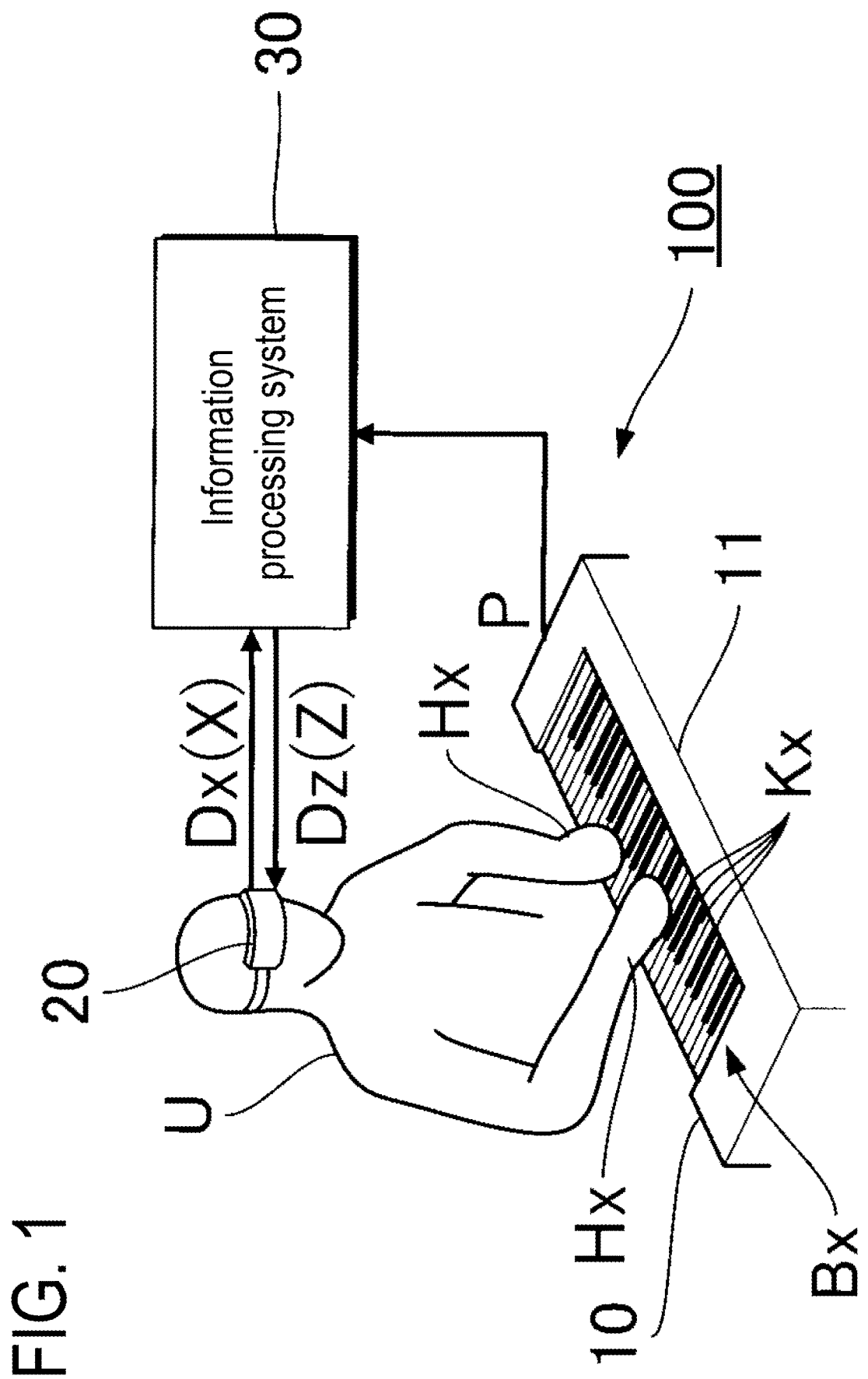
FIG. 1 is a block diagram of an example configuration of a musical performance system.

FIG. 1 is a block diagram of an example configuration of a musical performance system 100 according to the first embodiment. The musical performance system 100 is a computer system that assists a user U in playing a keyboard instrument 10. The user U practices playing the keyboard instrument 10 using the musical performance system 100. The musical performance system 100 includes the keyboard instrument 10, a video system 20, and an information processing system 30. Each of the keyboard instrument 10 and the video system 20 is communicable with the information processing system 30 via a wire or wirelessly.

The keyboard instrument 10 is an electronic instrument disposed in a real space where the user U exists. The keyboard instrument 10 includes a keyboard Bx and a housing 11. The keyboard Bx includes a plurality of keys Kx (white keys and black keys). Each of the plurality of keys Kx corresponds to a different sound pitch. The user U operates the keys Kx of the keyboard instrument 10 sequentially to perform a particular musical piece (hereinafter referred to as "target musical piece"). While the keyboard instrument 10 is being played by the user U, the keyboard instrument 10 supplies performance data P to the information processing system 30. The performance data P indicates the performance by the user U. The performance data P is data indicating musical notes played by the user U. Every time the user U operates the keyboard Bx (for example, every time a key is pressed), performance data P is output from the keyboard instrument 10. For example, the performance data P specifies: a sound pitch corresponding to a key Kx operated by the user U; and the strength with which the key was pressed. An example of the performance data P is event data, which is compliant with MIDI (Musical Instrument Digital Interface) standard.

The video system 20 is a video device (HMD, Head Mounted Display) mounted the head of the user U. An example of the video system 20 is a HMD goggle or HMD glasses.

Figure 2:
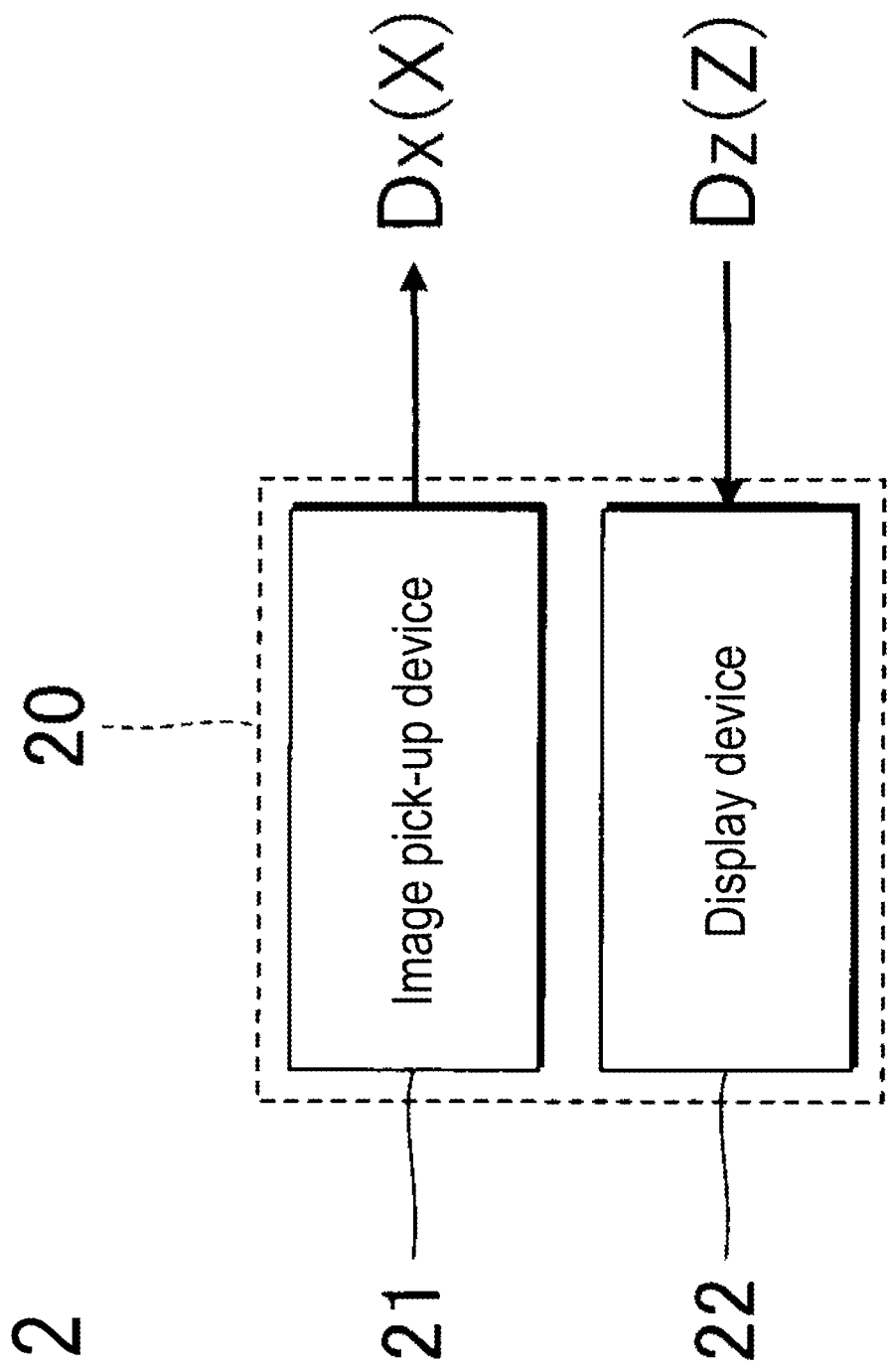
FIG. 2 is a block diagram of an example configuration of an image system.

FIG. 2 is a block diagram of an example configuration of the video system 20. The video system 20 includes an image pick-up device 21 and a display device 22. That is, the image pick-up device 21 and the display device 22 are mounted on the head of the user U. With this configuration, the image pick-up device 21 and the display device 22 are variable in position and direction depending on the movement of the head of the user U.

The image pick-up device 21 picks up an image of a predetermined range in a real space. Specifically, the image pick-up device 21 picks up an image of a predetermined range at a front part of the head of the user U (that is, the direction of line of sight). The user U playing the keyboard instrument 10 looks at the hands and fingers, Hx, of the user U and the keyboard Bx. As exemplified in FIG. 3, the image pick-up device 21 picks up a moving image X (hereinafter referred to as "observation image"). The observation image X includes an image of the right and left hands and fingers Hx of the user U and an image of the keyboard Bx of the keyboard instrument 10. The range of the image picked up by the image pick-up device 21 is variable based on the movement of the head of the user U. While the user U is playing the keyboard instrument 10, the image pick-up device 21 generates observation image data Dx. The observation image data Dx indicates the observation image X. The image pick-up device 21 includes, for example: an optical system such as a photographic lens; an image pick-up element that receives incident light from the optical system; and a processing circuit that generates observation image data Dx based on the amount of light received by the image pick-up element. The image pick-up device 21 automatically adjusts the amount of exposure to, for example, ensure clear boundaries between the white keys and the black keys of the keyboard Bx and the hands and fingers Hx of the user U.

The display device 22 illustrated in FIG. 2 displays various images under the control of the information processing system 30. Examples of the display device 22 include a liquid-crystal display panel and an organic EL (Electroluminescence) panel. The display device 22 is disposed in front of the eyes of the user U. The display device 22 according to the first embodiment is a non-transmissive display panel, through which light coming from the real space is not transmitted.

Figure 3:
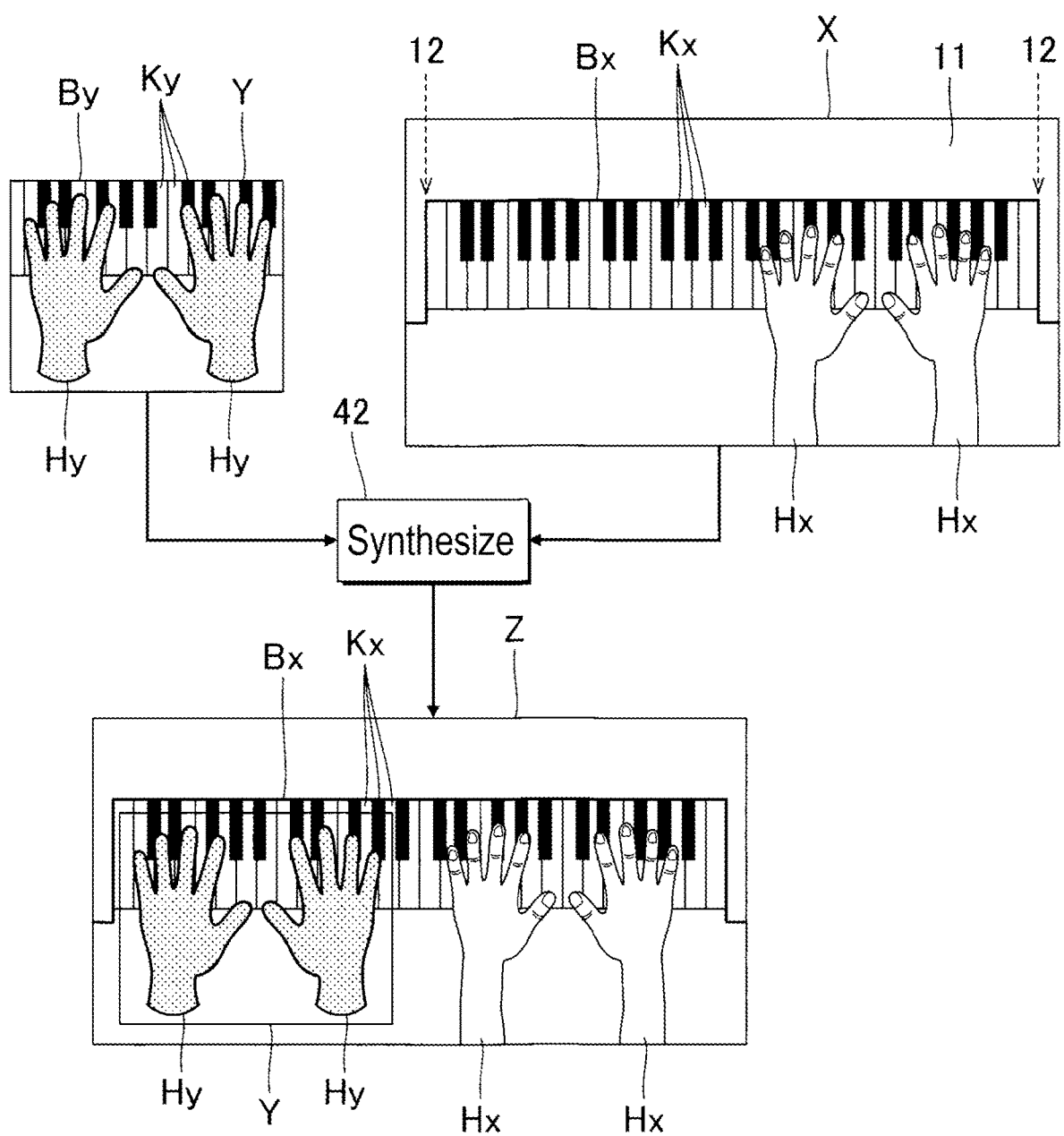
FIG. 3 illustrates how an information processing system operates.

The display device 22 according to the first embodiment displays a guide image Z illustrated in FIG. 3. The guide image Z is a moving image including the observation image X and a reference image Y. The reference image Y is a three-dimensional moving image including: the hands and fingers, Hy, of a virtual performer who is making a motion of a musical performance (this performer will be hereinafter referred to as "reference performer"); and a keyboard By.

The keyboard By is played by the reference performer. The reference performer is a virtual trainer who teaches the user U how to play a musical performance. It is to be noted that the reference performer may be the other performer who plays a duet with the user U. The keyboard By includes a plurality of keys Ky. The plurality of keys Ky are aligned in a lateral direction, similarly to the keyboard Bx in the real space. The reference image Y is a moving image showing how the reference performer is playing a target musical piece by operating the keyboard By using the hands and fingers Hy. That is, the reference image Y shows a fingering model for a target musical piece.

In the guide image Z, the reference image Y overlaps the keyboard Bx, which is shown in the observation image X. Specifically, the display device 22 displays the guide image Z in a manner in which the hands and fingers Hy of the reference performer and the keyboard By, which are shown in the reference image Y, overlap the keyboard Bx, which is shown in the observation image X. The size and orientation of each of the hands and fingers Hy and the keyboard By, which are shown in the reference image Y, are set based on the size and orientation of the keyboard Bx, which is shown in the observation image X. The reference image Y is enlarged or diminished to, example, make the keys Ky of the keyboard By equivalent in size to the keys Kx of the keyboard Bx, which is shown in the observation image X. Also, the angles of the hands and fingers Hy and the keyboard By, which are shown in the reference image Y, are controlled to make the surface of the keyboard By parallel to the surface of the keyboard Bx, which is shown in the observation image X. This configuration enables the user U to play the keyboard instrument 10 with a sense of the reference performer's existence in the real space.

Figure 4:
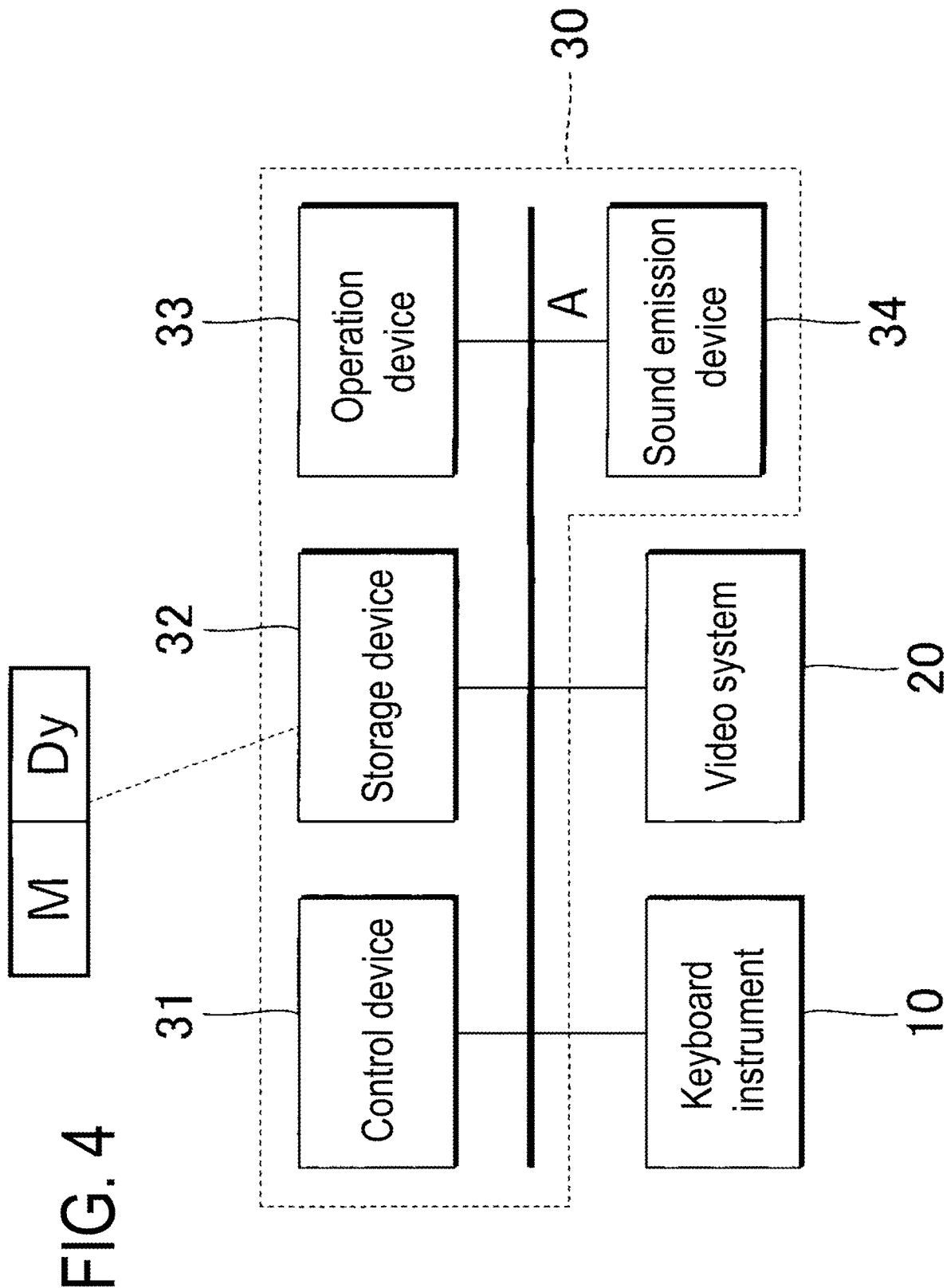
FIG. 4 is a block diagram of an example configuration of the information processing system.

FIG. 4 is a block diagram of an example configuration of the information processing system 30. The information processing system 30 is a computer system that controls the video system 20. Specifically, the information processing system 30 displays the guide image Z on the display device 22.

The information processing system 30 includes a control device 31, a storage device 32, an operation device 33, and a sound emission device 34. Examples of the information processing system 30 include a portable information device such as a smartphone and a tablet terminal; and a portable or desktop information device such as a personal computer. It is to be noted that the information processing system 30 may be a single device or a combination of a plurality of devices separate from each other. It is also to be noted that the information processing system 30 may be incorporated in the keyboard instrument 10 or the video system 20.

The control device 31 is a single processor or a plurality of processors to control the operation of the information processing system 30. Specifically, the control device 31 includes one or more than one of the following processors: CPU (Central Processing Unit), GPU (Graphics Processing Unit), SPU (Sound Processing Unit), DSP (Digital Signal Processor), FPGA (Field-Programmable Gate Array), and ASIC (Application-Specific Integrated Circuit).

The storage device 32 is a single memory or a plurality of memories to store a program executed by the control device 31 and various pieces of data used by the control device 31. Examples of the storage device 32 include a known recording medium such as a semiconductor recording medium and a magnetic recording medium; and a combination of a plurality of kinds of recording mediums. Other examples of the storage device 32 include a portable recording medium attachable and detachable to and from the information processing system 30; and a cloud storage or a similar recording medium accessible by the control device 31 via a communication network.

The storage device 32 according to the first embodiment stores musical piece data M and reference image data Dy of each of a plurality of musical pieces. The musical piece data M of each musical piece is data indicating a model or standard performance of the each musical piece. Specifically, the musical piece data M of each musical piece is time-series data that specifies the order in time of the musical notes constituting the each musical piece. An example of the musical piece data M is a music file compliant with the MIDI standard.

The reference image data Dy of each musical piece is a moving image data indicating the reference image Y of the each musical piece. Specifically, the reference image Y of each musical piece is a three-dimensional moving image showing how the reference performer is playing the each musical piece. The reference image Y of each musical piece can be referred to as a moving image showing a fingering model for the each musical piece.

The reference image data Dy is 3DCG (3-Dimensional Computer Graphics) data of any convenient form. An example of the reference image data Dy is point group data using point groups to represent the hands and fingers Hy of the reference performer and the keyboard By. Another example of the reference image data Dy is skeleton data indicating a frame or a joint of each of the hands and fingers Hy and the keyboard By. For example, the reference image data Dy is generated based on images of the hands and fingers Hy and the keyboard By which images have been picked up from a plurality of directions while a real performer is playing a musical piece. With this configuration, each of the plurality of keys Ky of the keyboard By, which is shown in the reference image Y, is displaced based on a performance played by the reference performer. That is, by watching the reference image Y, the user U is able to see how the keys Ky are displaced, or pressed, by the reference performer.

The operation device 33 is an input device that receives an operation made by the user U. For example, the user U operates the operation device 33 to select a target musical piece from a plurality of musical pieces. Examples of the operation device 33 include an operator used by the user U; and a touch panel that detects a contact of the user U. It is to be noted that an operation device 33 that is separate from the information processing system 30 may be connected to the information processing system 30 via a wire or wirelessly.

The sound emission device 34 emits sound under the control of the control device 31. Examples of the sound emission device 34 include a speaker and a pair of headphones. For example, a sound signal A is supplied to the sound emission device 34. The sound signal A indicates a waveform of sound corresponding to a motion of a musical performance made by the user U. The sound signal A is converted from a digital signal to an analogue signal by a D/A converter and amplified by an amplifier. The D/A converter and the amplifier, however, are not illustrated for the sake of simplicity. It is to be noted that a sound emission device 34 that is separate from the information processing system 30 may be connected to the information processing system 30 via a wire or wirelessly.

Figure 5:
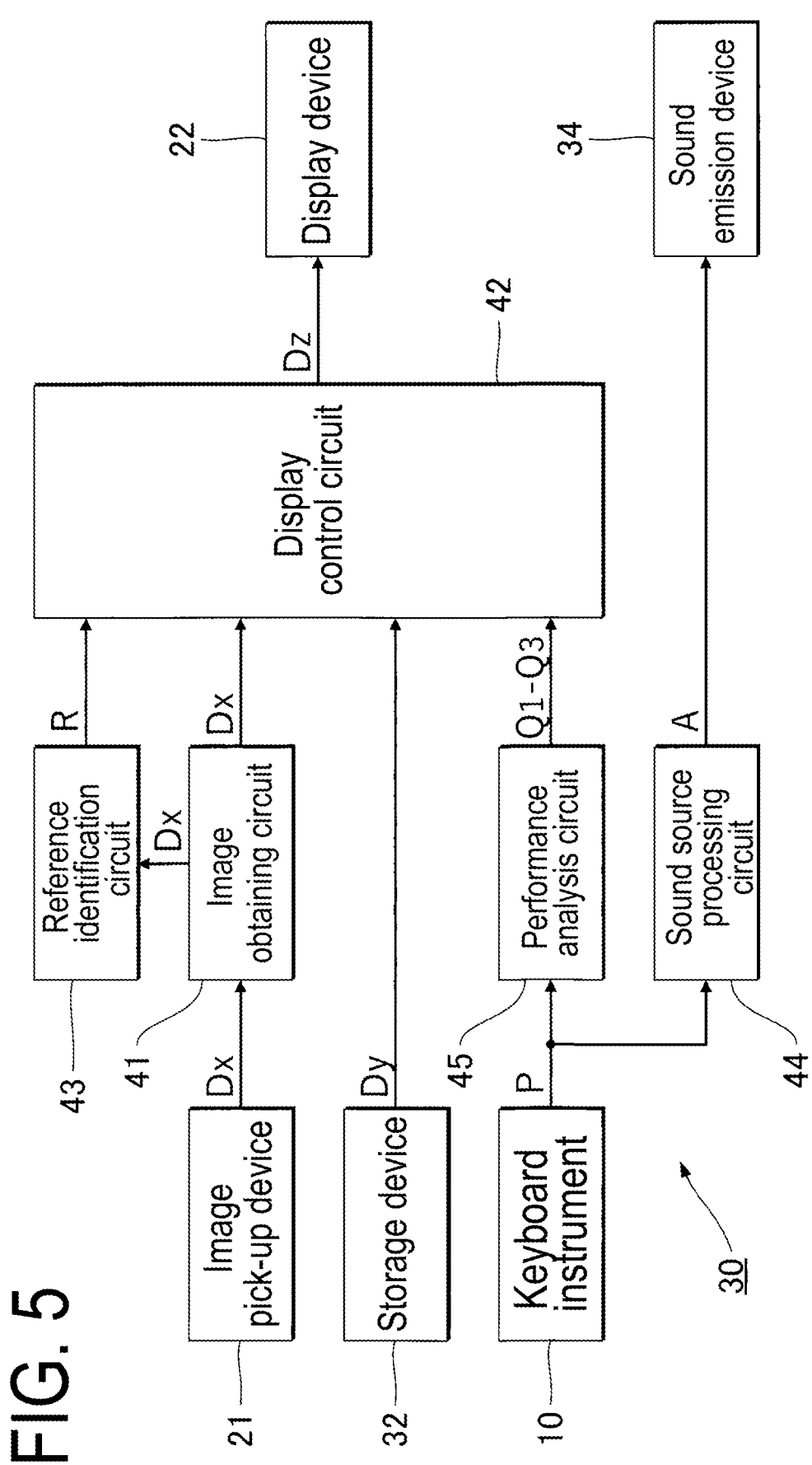
FIG. 5 is a block diagram of an example functional configuration of the information processing system.

FIG. 5 is a block diagram of an example functional configuration of the information processing system 30. The control device 31 executes the program stored in the storage device 32 to implement a plurality of functions to display the guide image Z on the display device 22. The plurality of functions include an image obtaining circuit 41, a display control circuit 42, a reference identification circuit 43, a sound source processing circuit 44, and a performance analysis circuit 45.

The image obtaining circuit 41 obtains the observation image X from the image pick-up device 21. Specifically, the image obtaining circuit 41 receives the observation image data Dx, which is generated by the image pick-up device 21, from the video system 20.

The display control circuit 42 displays the guide image Z on the display device 22. Specifically, in order to display the guide image Z on the display device 22, the display control circuit 42 outputs guide image data Dz to the display device 22. The guide image data Dz indicates the guide image Z. In order to generate the guide image Z, the display control circuit 42 synthesizes the observation image X obtained by the image obtaining circuit 41 with the reference image Y of the target musical piece stored in the storage device 32.

In generating the guide image Z, the display control circuit 42 synthesizes the reference image Y with the observation image X in a manner in which the hands and fingers Hy of the reference performer and the keyboard By overlap the keyboard Bx, which is shown in the observation image X. The size and orientation of each of the hands and fingers Hy and the keyboard By, which are shown in the reference image Y, are set based on the size and orientation of the keyboard Bx, which is shown in the observation image X. Specifically, the display control circuit 42 enlarges or diminishes the reference image Y to make the keys Ky of the keyboard By equivalent in size to the keys Kx of the keyboard Bx, which is shown in the observation image X. The display control circuit 42 also controls the angles of the hands and fingers Hy and the keyboard By, which are shown in the reference image Y, to make the surface of the keyboard By parallel to the surface of the keyboard Bx, which is shown in the observation image X.

The reference identification circuit 43 identifies a reference position R in the observation image X. The reference position R serves as a reference for the reference image Y. The reference image Y is located at a position corresponding to the reference position R in the observation image X. In this manner, the guide image Z is generated. In other words, the reference image Y is synthesized with the observation image X in a manner in which the reference image Y has a predetermined position relationship with the reference position R.

The reference identification circuit 43 analyzes the observation image X to identify the reference position R. Specifically, as exemplified in FIG. 3, the reference identification circuit 43 detects an end portion 12 of the keyboard Bx, which is shown in the observation image X, and determines the position of the end portion 12 as the reference position R. The end portion 12 includes: a left end portion 12, which is on the left side of the keyboard Bx; and a right end portion 12, which is on the right side of the keyboard Bx. The reference identification circuit 43 detects one or both of the left end portion 12 and the right end portion 12. Any known object-detection technique may be used to detect the end portion 12 of the keyboard Bx. For example, object detection processing that uses a trained model such as a deep neural network may be used to detect the end portion 12 (that is, identify the reference position R) by the reference identification circuit 43. It is to be noted that the end portion 12 of the keyboard Bx is clearly distinguished from the left and right ends of the housing 11 of the keyboard instrument 10 (the left and right ends are respectively located on the left side and right side of the end portion 12 of the keyboard Bx) in terms of optical properties such as color and material. Therefore, the end portion 12 of the keyboard Bx can be accurately and easily detected based on the observation image X.

The sound source processing circuit 44 illustrated in FIG. 5 generates a sound signal A that is based on an operation that the user U has made on the keyboard Bx. As described above, the performance data P specifies a sound pitch corresponding to the key Kx operated by the user U, and this performance data P is supplied to the information processing system 30 from the keyboard instrument 10. The sound source processing circuit 44 is a MIDI sound source that generates a sound signal A corresponding to the sound pitch specified by the performance data P. That is, the sound signal A is a signal indicating a sound waveform of a sound pitch corresponding to one or more keys Kx operated by the user U. In the first embodiment, the sound source processing circuit 44 is a software sound source implemented by the control device 31. Another possible example of the sound source processing circuit 44 is a hardware sound source dedicated to generating the sound signal A.

The performance analysis circuit 45 analyzes the performance of the user U playing the keyboard instrument 10. The performance analysis circuit 45 according to the first embodiment uses the performance data P supplied from the keyboard instrument 10 to analyze the performance of the user U. The performance analysis circuit 45 according to the first embodiment identifies a performance point Q1, a performance speed Q2, and an operation position Q3. The performance analysis circuit 45 repeats this analysis at predetermined time intervals.

The performance point Q1 is a point of time on a time axis of the target musical piece that is being played by the user U. Any known technique may be used to identify the performance point Q1. For example, in identifying the performance point Q1, the performance analysis circuit 45 compares the time order of the pieces of performance data P supplied from the keyboard instrument 10 with the musical piece data M of the target musical piece.

The performance speed Q2 is a speed (tempo) at which the user U plays the target musical piece. The performance analysis circuit 45 identifies the performance speed Q2 based on a change in time of the performance point Q1. For example, the displacement amount of the performance point Q1 per unit time is calculated as the performance speed Q2.

The operation position Q3 is a spatial position on the keyboard Bx of the keyboard instrument 10 which spatial position is where the user U is playing. As described above, the performance data P specifies a sound pitch played by the user U. The performance analysis circuit 45 determines the sound pitch specified by the performance data P as the operation position Q3.

Figure 6:
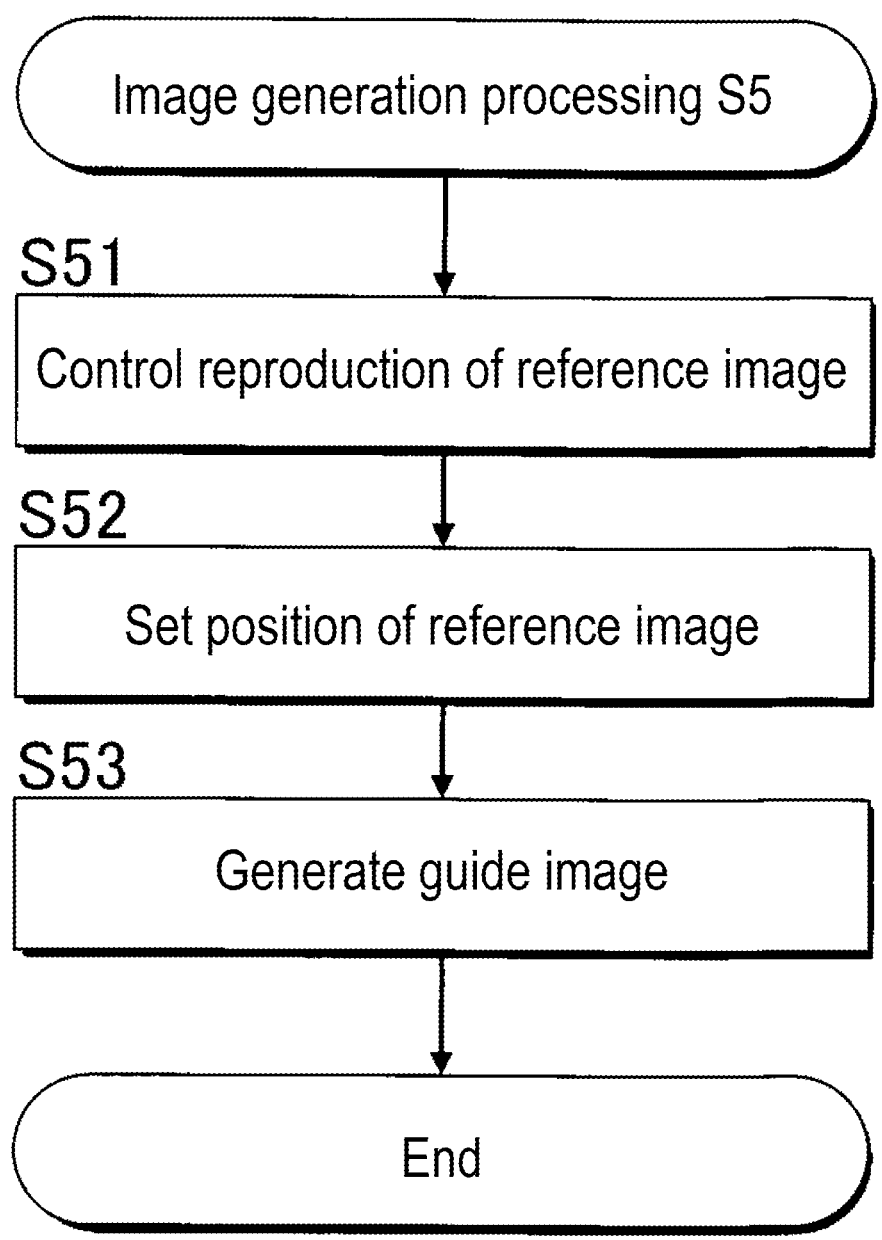
FIG. 6 is a flowchart of image generation processing.

The display control circuit 42 generates the guide image Z using the reference position R identified by the reference identification circuit 43 and using the analysis results (Q1 to Q3) obtained by the performance analysis circuit 45. FIG. 6 is a flowchart of image generation processing S5. The image generation processing S5 is performed by the display control circuit 42 in generating the guide image Z.

Upon start of the image generation processing S5, the display control circuit 42 controls the reference image Y to be reproduced based on the performance point Q1 and the performance speed Q2 (S51). From the storage device 32, the display control circuit 42 sequentially obtains images of parts of the reference image Y of the target musical piece which parts correspond to the performance point Q1. For example, there may be a case where the performance point Q1 is a point of time at which the reference performer plays a particular musical note of the target musical piece. In this case, the display control circuit 42 obtains an image that is included in the reference image Y and that corresponds to the point of time at which the reference performer plays the particular musical note. The display control circuit 42 also controls the reproduction speed of the reference image Y based on the performance speed Q2. For example, as the performance speed Q2 is higher, the reproduction speed of the reference image Y increases. That is, the display control circuit 42 according to the first embodiment causes the reproduction of the reference image Y to proceed along with the user U's performance of the target musical piece. In other words, the display control circuit 42 controls the reference image Y to be reproduced so that the user U's performance of the target musical piece is synchronized with the reproduction of the reference image Y.

The display control circuit 42 sets the position of the reference image Y relative to the observation image X based on the operation position Q3 and the reference position R (S52). Specifically, the display control circuit 42 identifies the operation position Q3 in the keyboard Bx based on the reference position R (that is, the end portion 12 of the keyboard Bx). Then, the display control circuit 42 identifies a position that has a predetermined relationship with the operation position Q3, and determines this position as the position of the reference image Y. For example, the display control circuit 42 arranges (displays) the reference image Y in an area of the keyboard Bx which area is higher or lower in sound than a predetermined area of the keyboard, the predetermined area including the operation position Q3. An example of the predetermined area including the operation position Q3 is a range of area centered around the operation position Q3 and one octave higher or lower than the operation position Q3. With this configuration, the reference image Y is arranged at a position that is one octave higher or lower than the sound pitch (the operation position Q3) at which the user U is playing. In other words, the position of the reference image Y is set in a manner in which the reference image Y does not overlap the user U's hands and fingers Hx, which are shown in the observation image X. This configuration enables the user U to easily look at the reference image Y while playing the keyboard instrument 10.

The display control circuit 42 synthesizes the reference image Y with the observation image X to generate the guide image Z (S53). Specifically, a part of the reference image Y which part corresponds to the performance point Q1 and the performance speed Q2 is synthesized with the observation image X at a position in the observation image X which position is set based on the operation position Q3 and the reference position R. The display control circuit 42 controls the size and the angle of the reference image Y in a manner in which the reference image Y overlaps the keyboard Bx, which is shown in the observation image X.

The position or the angle of the keyboard Bx, which is shown in the observation image X, is variable based on the movement of the head of the user U. The reference image Y is arranged so as to overlap the keyboard Bx, which is shown in the observation image X. This configuration ensures that the positions and the angles of the hands and fingers Hy of the reference performer and the position and the angle of the keyboard By are also variable based on the movement of the head of the user U when the hands and fingers Hy and the keyboard By are displayed on the display device 22. In other words, by changing the position and the direction of the head of the user U in any manner deemed convenient, the user U is able to look at the hands and fingers Hy of the reference performer and the keyboard By from a desired position and a desired angle. As described above, the keys Ky of the keyboard By, which is shown in the reference image Y, are displaced based on the reference performer's motion of a musical performance. Also in the guide image Z, which is displayed on the display device 22, the keys Ky of the keyboard By are displaced based on motions of the hands and fingers Hy associated with the musical performance. This configuration enables the user U to visually see the hands and fingers Hy of the reference performer with a sense of the reference performer's actual operation of the keyboard Bx of the keyboard instrument 10.

Figure 7:
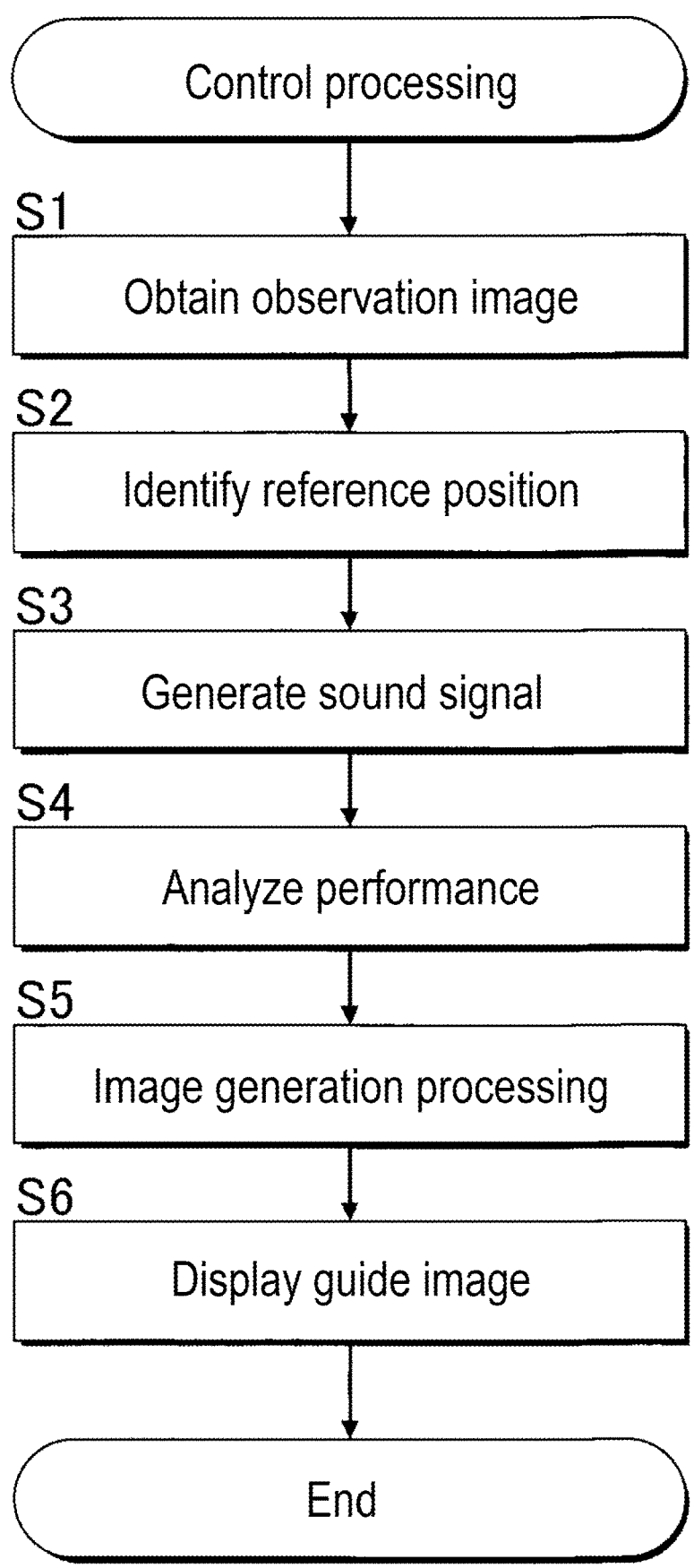
FIG. 7 is a flowchart of control processing.

FIG. 7 is a flowchart of control processing. The control processing is performed by the control device 31. The control processing exemplified below is repeated at predetermined time intervals.

Upon start of the control processing, the control device 31 (the image obtaining circuit 41) obtains an observation image X (S1). The reference identification circuit 43 analyzes the observation image X to identify the reference position R (S2). The control device 31 (the sound source processing circuit 44) generates a sound signal A based on performance data P supplied from the keyboard instrument 10 (S3). The control device 31 (the performance analysis circuit 45) analyzes the performance of the user U playing the keyboard instrument 10 to identify an operation position Q3, a performance point Q1, and a performance speed Q2 (S4). The order of the above-described steps (S1 to S4) of the control processing may be changed in any manner deemed convenient.

The control device 31 (the display control circuit 42) performs the image generation processing S5 exemplified in FIG. 6 to generate a guide image Z. As described above, the control device 31 (the display control circuit 42) synthesizes the observation image X with the reference image Y to generate the guide image Z. The control device 31 (the display control circuit 42) outputs guide image data Dz, which indicates the guide image Z, to the display device 22 to display the guide image Z on the display device 22 (S6).

As described above, in the first embodiment, the hands and fingers Hy of the reference performer, which is shown in the reference image Y, are displayed in a manner in which the hands and fingers Hy overlap the keyboard Bx, which is shown in the observation image X. This configuration provides the user U with an effective customer experience of playing the keyboard instrument 10 while looking at the reference performer's hands and fingers Hy superimposed on the keyboard Bx of the keyboard instrument 10. In the first embodiment, the positions and the angles of the image pick-up device 21 and the display device 22 are variable based on the position and the angle of the head of the user U. Along with a motion (for example, movement or rotation) of the head of the user U, the keyboard By is also variable in position and angle in the reference image Y displayed on the display device 22. This configuration provides the user U with a customer experience of playing the keyboard instrument 10 with a sense of the reference performer's existence in the real space.

Also in the first embodiment, the reference image Y is displayed at a position in the observation image X which position corresponds to the reference position R on the keyboard instrument 10. This configuration ensures that an image of the hands and fingers Hy of the reference performer is arranged at a position in the observation image X which position is appropriate relative to the keyboard instrument 10 in the real space.

In the first embodiment, the reproduction of the reference image Y is controlled based on the performance point Q1 and the performance speed Q2. That is, the reproduction of the reference image Y proceeds along with the user U's performance of a target musical piece. This configuration enables the user U to play the target musical piece with a sense of cooperating with the reference performer on the keyboard instrument 10.

B: Second Embodiment

The second embodiment will be described. It is to be noted that like reference numerals designate corresponding or identical elements throughout the above and following embodiments, and these elements will not be elaborated upon here. In the first embodiment, the end portion 12 of the keyboard Bx, which is shown in the observation image X, is identified as the reference position R. The second embodiment and the third embodiment are different from the first embodiment in how to identify the reference position R, and otherwise similar to the first embodiment.

Figure 8:
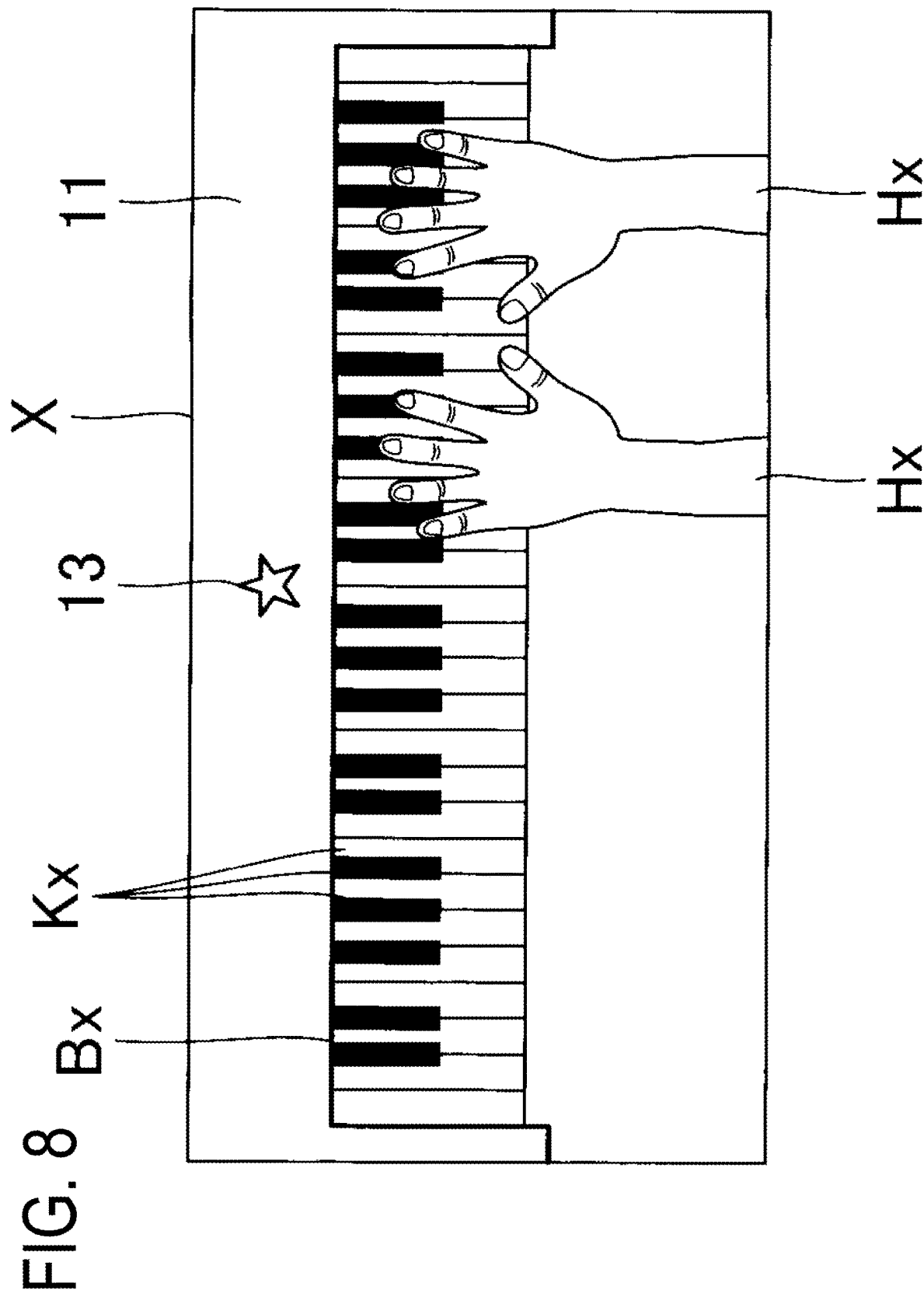
FIG. 8 schematically illustrates an observation image according to a second embodiment.

FIG. 8 schematically illustrates an observation image X according to the second embodiment. In the second embodiment, the keyboard instrument 10 is provided with a mark 13. In the example illustrated in FIG. 8, the mark 13 has a star shape. The mark 13 is formed on the exterior of the keyboard instrument 10. For example, the mark 13 is formed at a center portion in the lateral direction of the housing 11 of the keyboard instrument 10. The mark 13 is a graphical object or a symbol that visually shows a trade name of the keyboard instrument 10 or a provider (manufacturer or distributor) of the keyboard instrument 10. Typically, the mark 13 is a trademark. The mark 13 is formed on the housing 11 by, for example, coating or printing. Another possible example is that a planar member with the mark 13 formed on the surface is fixed to the housing 11 or that a planar member formed in the shape of the mark 13 is fixed to the housing 11.

The reference identification circuit 43 analyzes the observation image X to identify the reference position R (S2). The reference identification circuit 43 according to the second embodiment detects the mark 13 on the keyboard instrument 10, which is shown in the observation image X. Then, the reference identification circuit 43 determines the position of the mark 13 as the reference position R. Any known object-detection processing may be used to detect the mark 13. For example, object detection processing that uses a trained model such as a deep neural network may be used to detect the mark 13 (that is, identify the reference position R) by the reference identification circuit 43. Then, the position of the reference image Y relative to the observation image X is set based on the reference position R (S52). This processing is similar to the corresponding processing in the first embodiment.

The second embodiment provides advantageous effects similar to the advantageous effects provided in the first embodiment. It is to be noted that in many cases, the mark 13 on the keyboard instrument 10 is formed at a particular position on the keyboard instrument 10. In the second embodiment, the position of the mark 13 on the keyboard instrument 10 is identified as the reference position R. This configuration ensures that the reference position R is identified accurately even if such a situation occurs that the end portion 12 of the keyboard Bx can not be detected. For example, there may be a case where the end portion 12 of the keyboard Bx is located outside the image pick-up range of the image pick-up device 21 (a situation where the end portion 12 is not included in the observation image X). Even in this case, the reference position R can be identified in the second embodiment.

C: Third Embodiment

In the third embodiment, the reference identification circuit 43 identifies the position of a predetermined, particular key (hereinafter referred to as "particular key") Kx from among the plurality of keys Kx of the keyboard Bx of the keyboard instrument 10. Then, the reference identification circuit 43 determines the particular key Kx as the reference position R.

Before the guide image Z is displayed, the user U operates the particular key Kx of the keyboard Bx. The reference identification circuit 43 analyzes the observation image X to identify the reference position R (S2). The reference identification circuit 43 according to the third embodiment analyzes the observation image X to detect the key Kx operated by the user U in the observation image X (that is, detect the particular key Kx). Then, the reference identification circuit 43 determines the position of the particular key Kx as the reference position R. For example, a key Kx among the plurality of keys Kx shown in the observation image X is regarded as the particular key Kx if there was a change in tone at this key Kx upon operation by the user U. Then, the position of the reference image Y relative to the observation image X is set based on the reference position R (S52). This processing is similar to the corresponding processing in the first embodiment.

The third embodiment provides advantageous effects similar to the advantageous effects provided in the first embodiment. Also in the third embodiment, the position of the particular key Kx operated by the user U is identified as the reference position R. This configuration ensures that the reference position R is identified accurately even in a situation where the end portion 12 or the mark 13 on the keyboard instrument 10 can not be detected. For example, there may be a case where the end portion 12 and the mark 13 on the keyboard instrument 10 are located outside the image pick-up range of the image pick-up device 21. Even in this case, the reference position R can be identified in the third embodiment.

D: Fourth Embodiment

The fourth embodiment is different from the first embodiment in the operation of the performance analysis circuit 45 and the operation of the display control circuit 42. The performance analysis circuit 45 according to the fourth embodiment generates information (Q1 to Q3) similar to the information (Q1 to Q3) generated in the first embodiment. The performance analysis circuit 45 according to the fourth embodiment also determines whether the user U is playing the keyboard instrument 10. Specifically, when performance data P has been supplied from the keyboard instrument 10, the performance analysis circuit 45 determines that the keyboard instrument 10 is being played. When no performance data P has been supplied from the keyboard instrument 10, the performance analysis circuit 45 determines that the keyboard instrument 10 is not being played. This manner of determination by the performance analysis circuit 45 is not intended in a limiting sense. For example, the performance analysis circuit 45 may analyze the observation image X to determine whether the keyboard instrument 10 is being played or not.

The display control circuit 42 synthesizes the observation image X with the reference image Y to generate the guide image Z, similarly to the display control circuit 42 according to the first embodiment. In generating the guide image Z, the display control circuit 42 according to the fourth embodiment controls the numerical value of transmission parameter $\alpha$. The transmission parameter $\alpha$ is associated with the reference image Y. Specifically, the transmission parameter $\alpha$ serves as an indicator (alpha value) of the degree at which an element behind the reference image Y is transmitted through the reference image Y. In the fourth embodiment, the transmission parameter $\alpha$ is the degree of transparency. Specifically, as the numerical value of the transmission parameter $\alpha$ is larger, the degree at which the element behind the reference image Y is transmitted through the reference image Y is higher. For example, when the transmission parameter $\alpha$ is set to 0%, the reference image Y is displayed as a non-transparent image. When the transmission parameter $\alpha$ is set to 50%, the reference image Y is displayed as a semi-transparent image. When the reference image Y is displayed as a semi-transparent image, the user U is able to look at the part of the observation image X which part is located behind the reference image Y.

Figure 9:
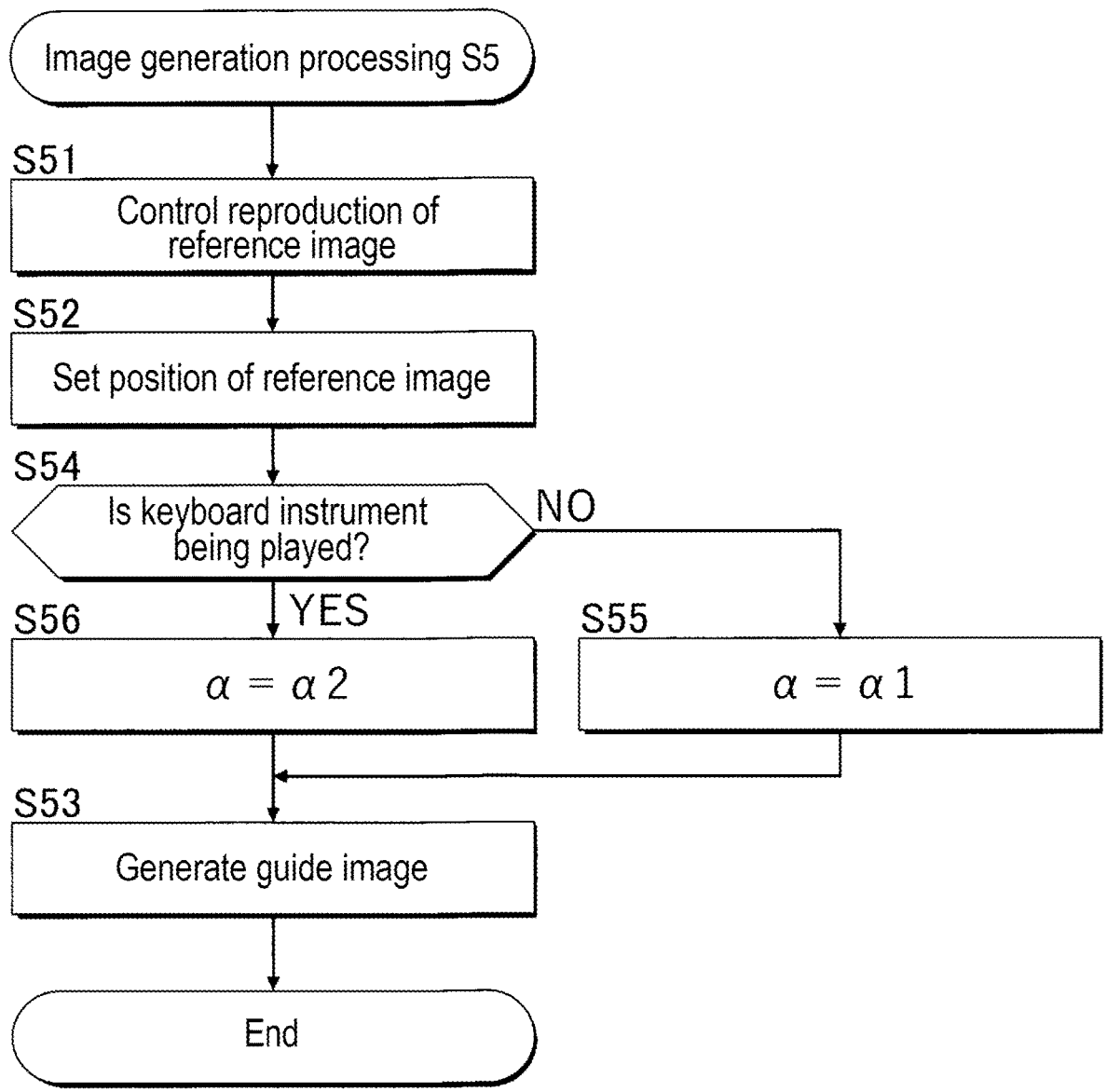
FIG. 9 is a flowchart of the image generation processing according to a fourth embodiment.

The display control circuit 42 controls the numerical value of the transmission parameter $\alpha$ based on whether the keyboard instrument 10 is being played or not. FIG. 9 is a flowchart of the image generation processing S5 according to the fourth embodiment. The processing of controlling the reproduction of the reference image Y (S51) and the processing of controlling the position of the reference image Y (S52) are similar to the respective, corresponding processings performed in the first embodiment.

The control device 31 (the performance analysis circuit 45) determines whether the keyboard instrument 10 is being played (S54). When the keyboard instrument 10 is not being played (S54: NO), the control device 31 (the display control circuit 42) sets the transmission parameter $\alpha$ to a numerical value of $\alpha$1 (S55). When the keyboard instrument 10 is being played (S54: YES), the control device 31 (the display control circuit 42) sets the transmission parameter $\alpha$ to a numerical value of $\alpha$2 (S56). Based on the transmission parameter $\alpha$ obtained in the above-described processing, the control device 31 (the display control circuit 42) synthesizes the reference image Y with the observation image X to generate the guide image Z (S53). The fourth embodiment is similar to the first embodiment other than the image generation processing S5.

Numerical value $\alpha$2 of the transmission parameter $\alpha$ is higher in transmission degree than numerical value $\alpha$1. As described above, the transmission parameter $\alpha$ according to the fourth embodiment is the degree of transparency. Numerical value $\alpha$2 is set to a numerical value larger than numerical value $\alpha$1. For example, numerical value $\alpha$2 is set to 50% (semi-transparent), and numerical value $\alpha$1 is set to 0% (non-transparent). Thus, when the keyboard instrument 10 is not being played, the reference image Y is displayed as a non-transparent image ($\alpha=\alpha$1). When the keyboard instrument 10 is being played, the reference image Y is displayed as a semi-transparent image ($\alpha=\alpha$2). That is, when the keyboard instrument 10 is in a state of being played by the user U, the degree of transmission of the reference image Y is higher than when the keyboard instrument 10 is in a state of not being played by the user U. It is to be noted that numerical value α1 is an example of the "first value", and numerical value α2 is an example of the "second value".

The fourth embodiment provides advantageous effects similar to the advantageous effects provided in the first embodiment. In the fourth embodiment, the numerical value of the transmission parameter α of the reference image Y is controlled. This control ensures such a usage form that the reference image Y is prioritized for attention from the user U, and such a usage form that the hands and fingers Hx of the user U are prioritized for attention from the user U. These usage forms are switchable to and from each other. This switchable configuration is in contrast to a configuration in which the numerical value of the transmission parameter α is fixed.

For example, in the fourth embodiment, when the user U is playing the keyboard instrument 10, the transmission parameter α is set to numerical value α2, which is higher in transmission degree than numerical value α1. This configuration enables the user U to prioritize and focus on the hands and fingers Hx of the user U itself. This configuration is in contrast to a configuration in which the transmission parameter α is fixed to numerical value α1 (a configuration in which the reference image Y is continually displayed as a non-transparent image). When the user U is not playing the keyboard instrument 10, the transmission parameter α is set to numerical value α1, which is lower in transmission degree than numerical value α2. This configuration enables the user U to easily look at the reference image Y. This configuration is in contrast to a configuration in which the transmission parameter α is fixed to numerical value α2 (a configuration in which the reference image Y is continually displayed as a semi-transparent image). It is to be noted that the second embodiment or the third embodiment is applicable to the fourth embodiment.

E: Fifth Embodiment

The fifth embodiment is similar to the fourth embodiment in that the numerical value of the transmission parameter α, which is applied to the reference image Y, is controlled in a variable manner. In the fourth embodiment, the transmission parameter α is controlled based on whether the keyboard instrument 10 is being played or not. In the fifth embodiment, the transmission parameter α is controlled based on a motion mode. In the fifth embodiment, the transmission parameter α is the degree of transparency, similarly to the transmission parameter α according to the fourth embodiment. Specifically, as the numerical value of the transmission parameter α is larger, the degree at which the element behind the reference image Y is transmitted through the reference image Y is higher.

The display control circuit 42 sets one of a first motion mode and a second motion mode as the motion mode. The first motion mode is a reference mode in which the reference image Y is prioritized for attention (visual recognition). The second motion mode is a practice mode in which the hands and fingers Hx of the user U are prioritized for attention. For example, the display control circuit 42 sets the motion mode based on an instruction input on the operation device 33 from the user U. Specifically, every time the user U instructs the motion mode to be switched, the display control circuit 42 switches the motion mode between the first motion mode and the second motion mode.

Figure 10:
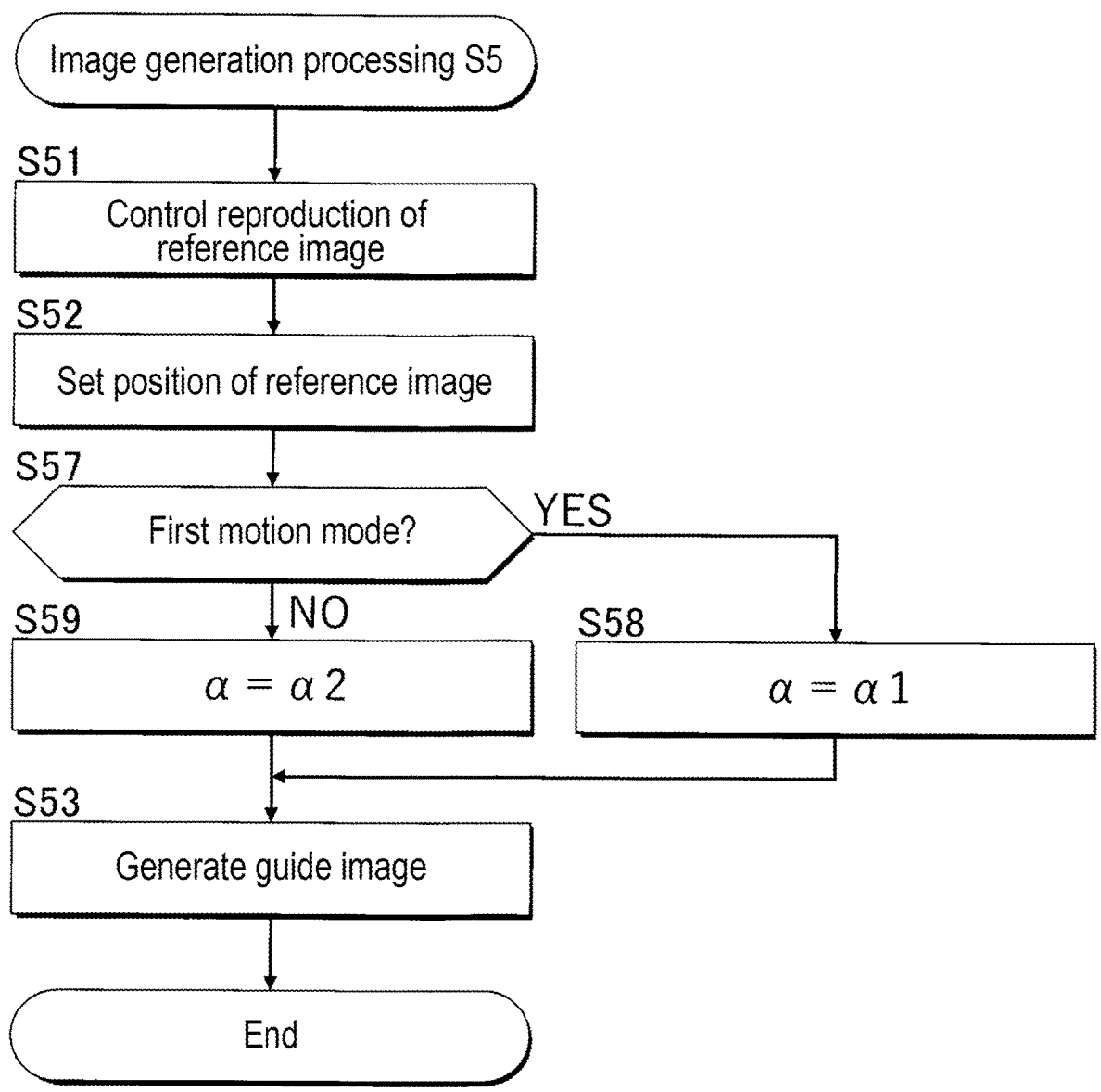
FIG. 10 is a flowchart of the image generation processing according to a fifth embodiment.

FIG. 10 is a flowchart of the image generation processing S5 according to the fifth embodiment. The processing of controlling the reproduction of the reference image Y (S51) and the processing of controlling the position of the reference image Y (S52) are similar to the respective, corresponding processings performed in the first embodiment.

The control device 31 (the display control circuit 42) determines whether the motion mode is the first motion mode (S57). When the motion mode is the first motion mode (S57: YES), the control device 31 (the display control circuit 42) sets the transmission parameter α to a numerical value of α1 (S58). When the motion mode is the second motion mode (S57: NO), the control device 31 (the display control circuit 42) sets the transmission parameter α to a numerical value of α2 (S59). Based on the transmission parameter α obtained in the above-described processing, the control device 31 (the display control circuit 42) synthesizes the reference image Y with the observation image X to generate the guide image Z (S53). The fifth embodiment is similar to the first embodiment other than the image generation processing S5.

Similarly to the fourth embodiment, numerical value α2 of the transmission parameter α is higher in transmission degree than numerical value α1. Specifically, numerical value α2 is set to a numerical value larger than numerical value α1. For example, numerical value α2 is set to 50% (semi-transparent), and numerical value α1 is set to 0% (non-transparent). Thus, in the first motion mode, the reference image Y is displayed as a non-transparent image (α=α1). In the second motion mode, the reference image Y is displayed as a semi-transparent image (α=α2). Specifically, in the first motion mode, the degree of transmission of the reference image Y is higher than in the second motion mode. It is to be noted that numerical value α1 is an example of the "first value", and numerical value α2 is an example of the "second value".

The fifth embodiment provides advantageous effects similar to the advantageous effects provided in the first embodiment. In the fifth embodiment, the numerical value of the transmission parameter α of the reference image Y is controlled. This control, similarly to the fourth embodiment, ensures such a usage form that the reference image Y is prioritized for attention from the user U, and such a usage form that the hands and fingers Hx of the user U are prioritized for attention from the user U. These usage forms are switchable to and from each other.

For example, in the fifth embodiment, in the second motion mode, the transmission parameter α is set to numerical value α2, which is higher in transmission degree than numerical value α1. This configuration enables the user U to prioritize and focus on the hands and fingers Hx of the user U itself. This configuration is in contrast to a configuration in which the transmission parameter α is fixed to numerical value α1 (a configuration in which the reference image Y is continually displayed as a non-transparent image). In the first motion mode, the transmission parameter α is set to numerical value α1, which is lower in transmission degree than numerical value α2. This configuration enables the user U to easily look at the reference image Y. This configuration is in contrast to a configuration in which the transmission parameter α is fixed to numerical value α2 (a configuration in which the reference image Y is continually displayed as a semi-transparent image). It is to be noted that the second embodiment or the third embodiment is applicable to the fifth embodiment.

F: Sixth Embodiment

Figure 11:
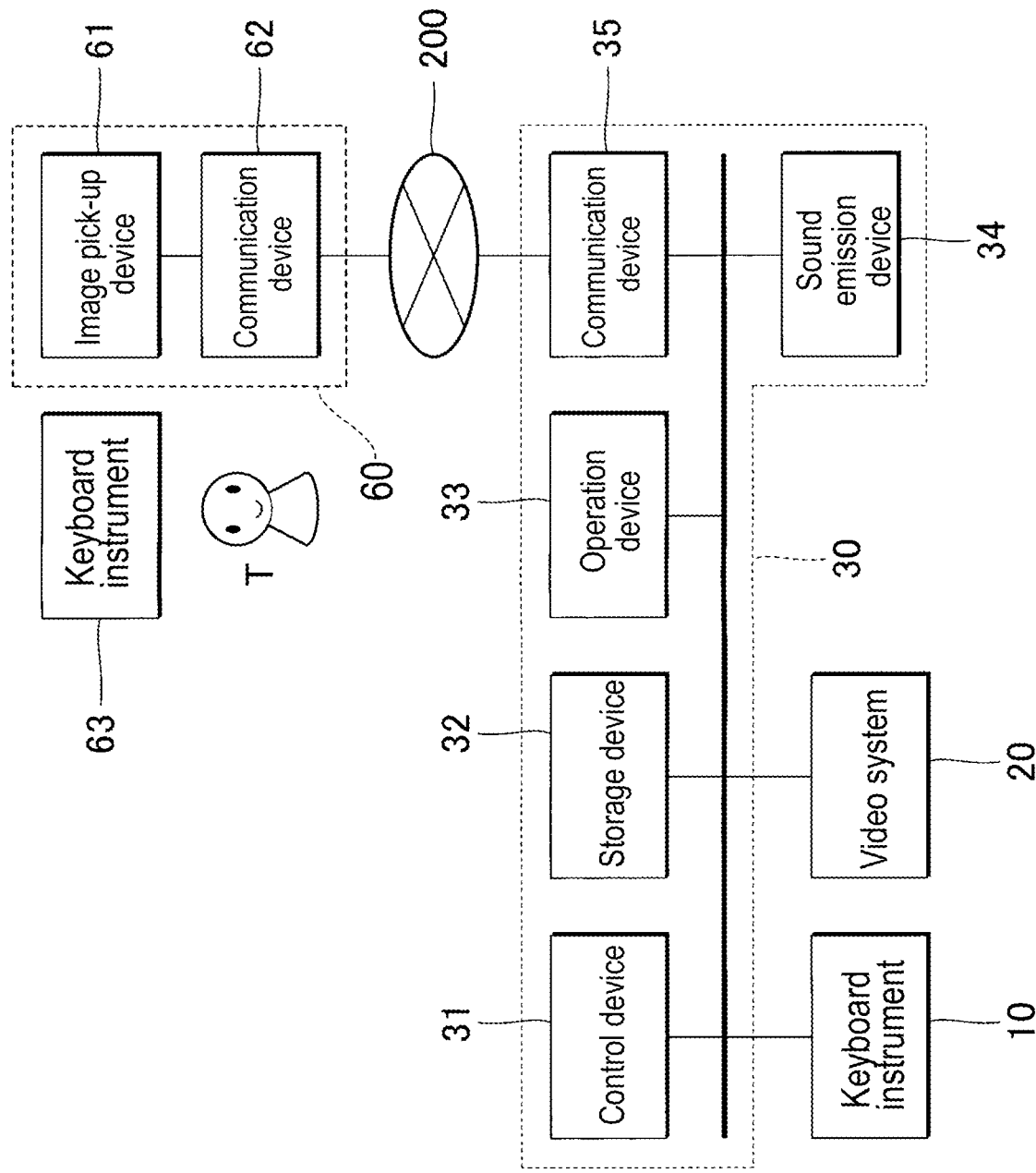
FIG. 11 is a block diagram of an example configuration of the musical performance system according to a sixth embodiment.

FIG. 11 is a block diagram of an example configuration of the musical performance system 100 according to the sixth embodiment. In the musical performance system 100 according to the sixth embodiment, the information processing system 30 includes a communication device 35 and elements that are similar to the elements in the first embodiment (the control device 31, the storage device 32, the operation device 33, and the sound emission device 34). The communication device 35 communicates with an external apparatus or device via a communication network 200, which is the Internet or another network. It is to be noted that the communication between the communication device 35 and the communication network 200 may be wired and wireless. It is also to be noted that a communication device 35 that is separate from the information processing system 30 may be connected to the information processing system 30 via a wire or wirelessly.

As illustrated in FIG. 11, a recording system 60 is a computer system that records the reference image Y and is used when a trainer T teaches the user U how to play the keyboard instrument 10. The trainer T corresponds to the reference performer. Specifically, in the sixth embodiment, the reference image Y is a moving image showing how the trainer T plays a keyboard instrument 63. An example of the keyboard instrument 63 is a natural musical instrument that includes the keyboard By or an electronic instrument that includes the keyboard By. The recording system 60 includes an image pick-up device 61 and a communication device 62.

The image pick-up device 61 picks up an image of how the trainer T plays the keyboard instrument 63. Specifically, the image pick-up device 61 picks up a reference image Y. The reference image Y includes an image of the right and left hands and fingers Hy of the trainer T and an image of the keyboard By of the keyboard instrument 63. Examples of the communication device 62 include a portable information device such as a smartphone and a tablet terminal; and a portable or desktop information device such as a personal computer. The image pick-up device 61 may be incorporated in the communication device 62.

The communication device 62 sends reference image data Dy to the information processing system 30. The reference image data Dy indicates the reference image Y. Specifically, the reference image data Dy is a moving image data indicating a motion of a musical performance which motion is made by the trainer T (reference performer). An example of the reference image data Dy is point group data or skeleton data that indicates the hands and fingers Hy of the trainer T and the keyboard By, similarly to the first embodiment. While the trainer T is playing the keyboard instrument 63, the reference image data Dy is send to the musical performance system 100 from the recording system 60. The reference image data Dy is received by the communication device 35 of the information processing system 30 via the communication network 200.

Figure 12:
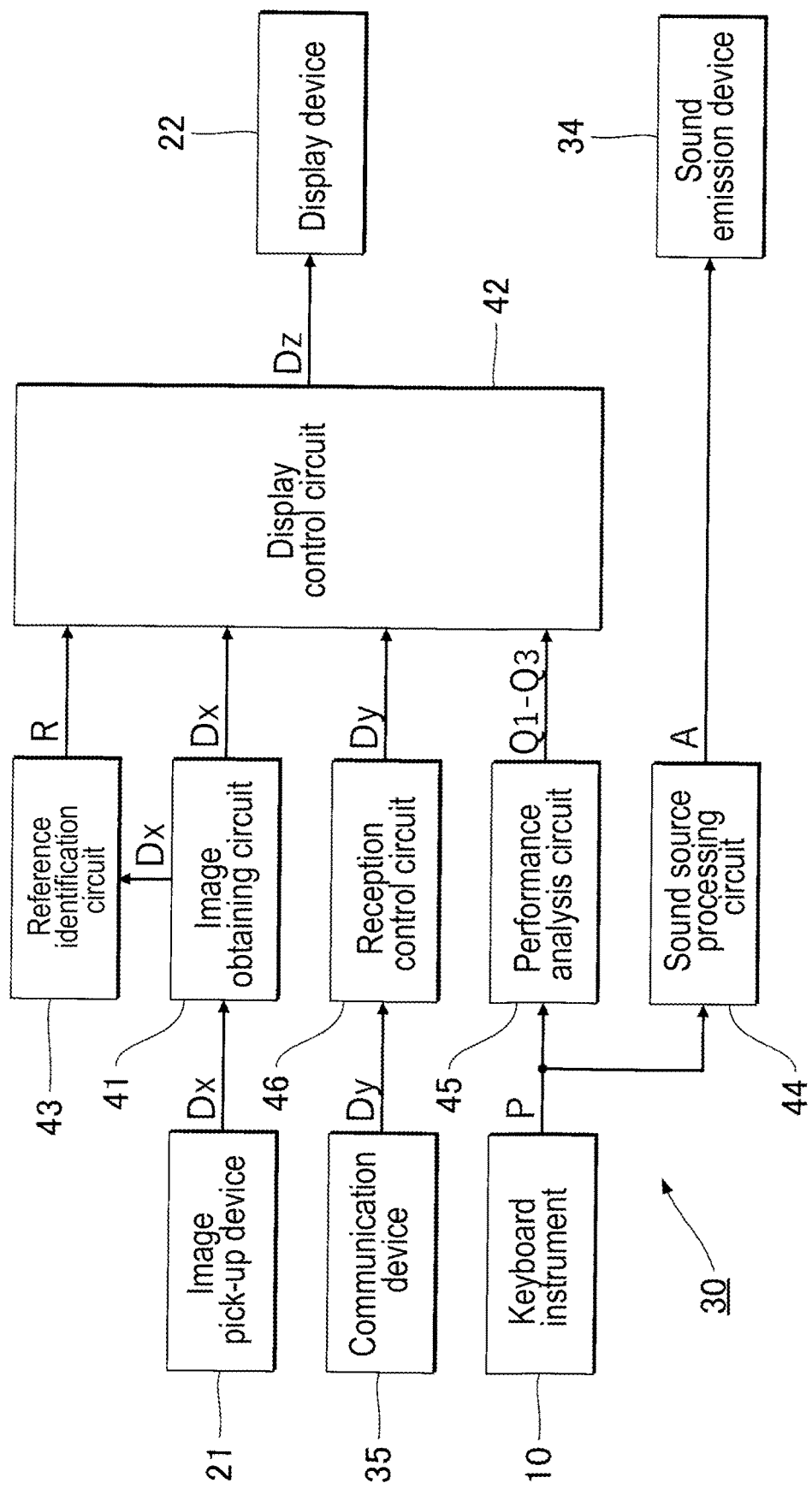
FIG. 12 is a block diagram of an example functional configuration of the information processing system according to the sixth embodiment.

FIG. 12 is a block diagram of an example functional configuration of the information processing system 30 according to the sixth embodiment. The control device 31 according to the sixth embodiment serves as a reception control circuit 46 and as elements similar to the elements in the first embodiment (the image obtaining circuit 41, the display control circuit 42, the reference identification circuit 43, the sound source processing circuit 44, and the performance analysis circuit 45). The reception control circuit 46 receives, at the communication device 35, the reference image data Dy sent from the recording system 60.

The display control circuit 42 according to the first embodiment generates the guide image Z by synthesizing the observation image X with the reference image Y of the reference image data Dy stored in the storage device 32. The display control circuit 42 according to the sixth embodiment generates the guide image Z by synthesizing the observation image X with the reference image Y of the reference image data Dy obtained by the reception control circuit 46 (S5). Specifically, the display control circuit 42 displays, on the display device 22, the reference image Y indicated by the reference image data Dy. Thus, in the sixth embodiment, the guide image Z includes the observation image X and the reference image Y. The observation image X shows how the user U plays the keyboard instrument 10. The reference image Y shows how the trainer T plays the keyboard instrument 63. While the trainer T is playing the keyboard instrument 63, the display device 22 displays the guide image Z in a real time manner. The guide image Z includes the reference image Y of the musical performance.

The sixth embodiment provides advantageous effects similar to the advantageous effects provided in the first embodiment. In the sixth embodiment, while an image of the trainer T's (reference performer's) motion of a musical performance is being picked up, the reference image Y, which shows this motion, can be displayed on the user U's display device 22. This configuration enables the user U to play the keyboard instrument 10 with a sense of the trainer T's existence near the user U, even though the trainer T is actually remote from the user U.

G: Modifications

Modifications of the above-described embodiments will be described below. An embodiment(s) arbitrarily selected from the above-described embodiments may be combined with a modification(s) arbitrarily selected from the following modifications insofar no contradiction occurs.

(1) In the above-described embodiments, the display device 22 is a non-transmissive display panel. The display device 22 may, however, be a transmissive display panel that transmits light coming from the real space. In a modification in which a transmissive display device 22 is used, it is not essential to display the observation image X on the display device 22. Specifically, the display control circuit 42 displays, as the guide image Z, the reference image Y on the display device 22. This configuration enables the user U to look at the reference image Y over the keyboard Bx while looking at the keyboard Bx of the keyboard instrument 10 utilizing transmitted light from the real space. In this modification in which a transmissive display device 22 is used, the observation image X is used to identify the reference position R on the reference image Y, similarly to the above-described embodiments. As seen from the above description, the observation image X may be omitted. The display device 22 displays the reference image Y using augmented reality (AR) or mixed reality (MR) technology.

(2) In the fourth and fifth embodiments, the transmission parameter $\alpha$ is the degree of transparency. The transmission parameter $\alpha$ may, however, be the degree of non-transparency. In a modification in which the transmission parameter $\alpha$ is the degree of non-transparency, as the numerical value of the transmission parameter $\alpha$ is larger, the degree at which the element behind the reference image Y is transmitted through the reference image Y is lower. In this modification, when the keyboard instrument 10 is not being played, the transmission parameter $\alpha$ is set to a numerical value of a1. When the keyboard instrument 10 is being played, the transmission parameter $\alpha$ is set to a numerical value of $\alpha 2$. This configuration is similar to the fourth embodiment. Also in this modification, in the first motion mode, the transmission parameter $\alpha$ is set to a numerical value of $\alpha 1$. In the second motion mode, the transmission parameter $\alpha$ is set to a numerical value of α2. This configuration is similar to the fifth embodiment. It is to be noted, however, that when the transmission parameter α is the degree of non-transparency, numerical value α2 is smaller than numerical value α1. For example, numerical value α2 is set to 50% (semi-transparent), and numerical value α1 is set to 100% (non-transparent). As seen from the above description, numerical value α2 is generally referred to as a numerical value higher in transmission degree than numerical value α1, irrespective of whether the transmission parameter α is degree of transparency or the degree of non-transparency. Whether the numerical value of the transmission parameter α is large or small may have any relationship with whether the degree of transmission of the reference image Y is high or low.

(3) In the above-described embodiments, the keyboard instrument 10 is an electronic instrument capable of outputting the performance data P. The keyboard instrument 10 may, however, be a natural musical instrument that does not output the performance data P. In this case, a microphone collects sound emitted from the keyboard instrument 10, which is a natural musical instrument. In this manner, the sound signal A is generated. The performance analysis circuit 45 uses the sound signal A to analyze the performance of the user U playing the keyboard instrument 10. For example, the performance analysis circuit 45 analyzes the sound signal A to generate a time order of the performance data P. Then, the performance analysis circuit 45 compares the time order of the performance data P with the musical piece data M of the target musical piece to identify the performance point Q1. Similarly, the performance speed Q2 and the operation position Q3 are identified by analyzing the sound signal A.

(4) In the above-described embodiments, the performance analysis circuit 45 uses the performance data P to analyze the performance of the user U. The performance analysis circuit 45, however, may use the observation image X to analyze the performance of the user U. For example, the performance analysis circuit 45 analyzes the observation image X to identify the operation position Q3. Specifically, the performance analysis circuit 45 detects the hands and fingers Hx of the user U from the observation image X, and identifies the operation position Q3 based on the positions of the hands and fingers Hx relative to the reference position R.

(5) In the above-described embodiments, the image pick-up device 21 and the display device 22 are mounted on the head of the user U. It is not essential, however, that the image pick-up device 21 and the display device 22 be mounted on the head of the user U. For example, one or both of the image pick-up device 21 and the display device 22 may be arranged in the vicinity of the keyboard instrument 10. It is to be noted, however, that in the configuration in which the image pick-up device 21 and the display device 22 are mounted on the head of the user U, the positions and the angles of the image pick-up device 21 and the display device 22 are variable based on the position and the angle of the head of the user U. That is, the observation image X and the reference image Y displayed on the display device 22 are variable based on the movement of the head of the user U. This configuration enables the user U to play the keyboard instrument 10 with a sense of the reference performer's existence in the real space.

(6) In the above-described embodiments, the hands and fingers Hy of the reference performer (the trainer T) are displayed on the display device 22. It is also possible, however, that the upper half of the body or the whole body of the reference performer is displayed on the display device 22 as the reference image Y. Also in the above-described embodiments, the reference image Y includes an image of the hands and fingers Hy of the reference performer and an image of the keyboard By. An image of the keyboard By, however, may be omitted from the reference image Y.

(7) In the above-described embodiments, the user U and the reference performer play a common target musical piece. The user U and the reference performer may, however, play different musical content. For example, when a target musical piece has a plurality of performance parts, the user U may play a first part and the reference performer may play a second part. Each of the first part and the second part is one or more performance parts of a target musical piece.

(8) The information processing system 30 may be implemented by, for example, a server apparatus that communicates with a terminal device such as a smartphone and a tablet terminal. The image pick-up device 21 is incorporated in or connected to the terminal device. The terminal device sends the observation image data Dx and the image pick-up device 21 to the information processing system 30. The observation image data Dx is generated by the image pick-up device 21, and the performance data P is generated by the keyboard instrument 10. The information processing system 30 generates the guide image data Dz based on the observation image data Dx and the performance data P, similarly to the information processing system 30 according to any of the above-described embodiments. Then, the information processing system 30 sends the guide image data Dz to the terminal device. The terminal device displays, on the display device 22, a guide image Z indicated by the guide image data Dz. The display device 22 may be incorporated in, for example, the terminal device.

(9) As described above, the functions of the information processing system 30 according to any of the above-described embodiments are implemented by cooperation of a single processor or a plurality of processors constituting the control device 31 with a program stored in the storage device 32. The program exemplified in the above-described embodiments may be provided in the form of a computer-readable recording medium and installed in a computer. An example of the recording medium is a non-transitory recording medium, and a preferable example is an optical recording medium (optical disc) such as a CD-ROM. The recording medium, however, encompasses any other recording media, such as a semiconductor recording medium and a magnetic recording medium. As used herein, the term "non-transitory recording medium" is intended to mean any recording medium that is other than a transitory, propagating signal. A volatile recording medium is encompassed within the non-transitory recording medium. The program may be distributed from a distribution device via a communication network. In this case, a recording medium that stores the program in the distribution device corresponds to the non-transitory recording medium.

H: Additional Notes

The above-described embodiments can be exemplified by the following configurations.

One form (form 1) of the present disclosure is an information processing system that includes an image obtaining circuit and a display control circuit. The image obtaining circuit is configured to obtain observation images of a first keyboard of a first keyboard instrument. The display control circuit is configured to display, on a display device, the observation images and reference images. The reference images include moving images of at least one hand and one or more fingers of a reference performer who is playing a second keyboard of a second keyboard instrument. The at least one hand and the one or more fingers of the reference performer are displayed overlapping the first keyboard included in the observation images. With this configuration, the hands and fingers of the reference performer shown in the reference image are displayed to overlap the keyboard shown in the observation image. This configuration enables the user to play the keyboard instrument while looking at the hands and fingers of the reference performer superimposed on the keyboard of the keyboard instrument.

In a specific example (form 2) of form 1, the display device is mounted on a head of a user of the information processing system. In this form, the positions and the angles of the image pick-up device and the display device are variable based on the position and the angle of the head of the user. Specifically, the position and the angle of the keyboard is variable in the reference image displayed on the display device along with the movement of the head of the user. This configuration enables the user to play the keyboard instrument with a sense of the reference performer's existence in the real space.

In a specific example (form 3) of form 1 or 2, the reference images include the second keyboard played by the reference performer. The display control circuit is configured to display the reference images on the display device such that the second keyboard overlaps the first keyboard shown in the observation images. In this form, the keys of the reference keyboard are displaced based on a motion of the reference performer, and such reference keyboard is superimposed on the keyboard in the real space. This configuration enables the user to visually see the hands and fingers of the reference performer with a sense of the reference performer's actual operation of the keyboard.

In a specific example (form 4) of one of forms 1 to 3, the information processing system further includes a reference identification circuit analyze the observation images to identify a reference position relative to the first keyboard instrument included in the observation images. The display control circuit is configured to display the reference images at a position corresponding to the reference position. In this form, the reference image is displayed at a position corresponding to the reference position on the keyboard instrument. This configuration ensures that the hands and fingers of the reference performer are arranged at positions appropriate relative to the keyboard instrument in the real space.

In a specific example (form 5) of form 4, the reference identification circuit is further configured to detect an end portion of the first keyboard included in the observation images and determine a position of the end portion as the reference position. The (left or right) end portion of the keyboard instrument is clearly distinguished in terms of optical properties such as color from parts of the keyboard instrument which parts are located on the outer sides of the keyboard (examples of such parts are wooden clappers and wooden arm pieces). Therefore, the end portion of the keyboard is detected accurately and easily from an image of the keyboard. Thus, in this form, the position of the end portion of the keyboard is identified as a reference position. This form ensures that the reference position is identified accurately and easily.

In a specific example (form 6) of form 4, the reference identification circuit is further configured to detect a mark on the first keyboard instrument included in the observation images and determine a position of the mark as the reference position. A mark, such as a trademark, on a keyboard instrument is in many cases formed at a particular position on the keyboard instrument (for example, a center portion in the lateral direction of the housing of the keyboard instrument). In the above-described form, the position of the mark on keyboard instrument is identified as the reference position. This form ensures that the reference position is identified accurately even if the end portion of the keyboard portion can not be detected.

In a specific example (form 7) of form 4, the reference identification circuit is further configured to detect an operated key from among a plurality of keys of the first keyboard shown in the observation images, and determine a position of the operated key as the reference position. In this form, the position of the key operated by the user is identified as the reference position. This form ensures that the reference position is identified accurately even if the end portion of the keyboard instrument or the mark on the keyboard instrument can not be detected.

In a specific example (form 8) of one of forms 1 to 7, the display control circuit is further configured to control a numerical value of a transmission parameter of the reference images. In this form, a numerical value of a transmission parameter of the reference image is controlled. This control ensures such a usage form that the hands and fingers of the reference performer are prioritized for attention from the user, and such a usage form that the user itself is prioritized for attention from the user. These usage forms are switchable to and from each other. This switchable configuration is in contrast to a configuration in which the numerical value of the transmission parameter of the reference image is fixed.

In a specific example (form 9) of form 8, the information processing system further includes a performance analysis circuit configured to determine whether the first keyboard instrument is being played. In a case where it is determined that the first keyboard instrument is not being played, the display control circuit is further configured to set the transmission parameter to a first value. In a case where it is determined that the first keyboard instrument is being played, the display control circuit is further configured to set the transmission parameter to a second value that is higher in transmission degree than the first value. In this form, while the user is playing the keyboard instrument, the transmission parameter is set to the second value, which is higher in transmission degree than the first value. This form enables the user to prioritize and focus on the hands and fingers of the user itself. This form is in contrast to a configuration in which the transmission parameter is fixed to the first value. While the user is not playing the keyboard instrument, the transmission parameter is set to the first value, which is lower in transmission degree than the second value. This form enables the user to easily look at the reference image. This form is in contrast to a configuration in which the transmission parameter is fixed to the second value.

In a specific example (form 10) of form 8, in a first motion mode, the display control circuit is further configured to set the transmission parameter to a first value. In a second motion mode, the display control circuit is further configured to set the transmission parameter to a second value that is higher in transmission degree than the first value. In this form, in the second motion mode, the transmission parameter is set to the second value, which is higher in transmission degree than the first value. This form enables the user to prioritize and focus on the hands and fingers of the user itself. This form is in contrast to a configuration in which the transmission parameter is fixed to the first value. In the first motion mode, the transmission parameter is set to the first value, which is lower in transmission degree than the second value. This form enables the user to easily look at the reference image. This form is in contrast to a configuration in which the transmission parameter is fixed to the second value.

In a specific example (form 11) of one of forms 1 to 10, the information processing system further includes a performance analysis circuit configured to identify an operation position on the first keyboard of the first keyboard instrument. The display control circuit is further configured to display the reference images in an area of the first keyboard that is higher or lower in sound than a predetermined area of the keyboard, the predetermined area including the operation position. In this form, the reference image is displayed in an area of the keyboard which area is higher or lower in sound than the operation position of the user. That is, the reference image is displayed without overlapping the hands and fingers of the user. This form enables the user to easily look at the reference image while playing the keyboard instrument.

In a specific example (form 12) of one of forms 1 to 11, the information processing system further includes a performance analysis circuit configured to identify a performance point in a musical piece. The display control circuit is further configured to display, on the display device, a performance-point part of the reference images that correspond to the performance point in the musical piece. In this form, the reproduction of the reference image proceeds along with the user's performance of a musical piece. This form enables the user to play the musical piece with a sense of cooperating with the reference performer on the keyboard instrument.

In a specific example (form 13) of form 12, the performance analysis circuit is further configured to identify a performance speed, and the display control circuit is further configured to control a reproduction speed of the reference images based on the performance speed. In this form, the reproduction of the reference image proceeds along with the user's performance of a musical piece. This form enables the user to play the musical piece with a sense of cooperating with the reference performer on the keyboard instrument.

In a specific example (form 14) of one of forms 1 to 13, the information processing system further includes a reception control circuit configured to receive, using a communication device, moving image data indicating a motion made by the reference performer. The display control circuit is configured to display, on the display device, the reference image indicated by the moving image data. In this form, while an image of the reference performer's motion of a musical performance is being picked up, a reference image showing this motion can be displayed on the user's display device. This form enables the user to play the keyboard instrument with a sense of the reference performer's existence near the user, even though the reference performer is actually remote from the user.

Another form of the present disclosure is a computer system implemented method of processing information. The method includes obtaining observation images of a first keyboard of a first keyboard instrument. The method also includes displaying, on a display device, the observation images and reference images, the reference images including a moving image of at least one hand and one or more fingers of a reference performer who is playing a second keyboard of a second keyboard instrument, such that the at least one hand and the one or more fingers of the reference performer are displayed overlapping the first keyboard included in the observation images.

Another form of the present disclosure is a non-transitory computer-readable recording medium storing a program that, when executed by a computer system, causes the computer system to perform a method including obtaining observation images of a first keyboard of a first keyboard instrument. The method also includes displaying, on a display device, the observation images and reference images, the reference images including a moving image of at least one hand and one or more fingers of a reference performer who is playing a second keyboard of a second keyboard instrument, such that the at least one hand and the one or more fingers of the reference performer are displayed overlapping the first keyboard included in the observation images.

What is claimed is:

1. An information processing system comprising:
   an image obtaining circuit configured to obtain observation images of a first keyboard of a first keyboard instrument; and
   a display control circuit configured to display, on a display device, the observation images and reference images, the reference images including moving images of at least one hand and one or more fingers of a reference performer who is playing a second keyboard of a second keyboard instrument,
   wherein the at least one hand and the one or more fingers of the reference performer are displayed overlapping the first keyboard included in the observation images.

2. The information processing system according to claim 1, wherein the display device is mounted on a head of a user of the information processing system.

3. The information processing system according to claim 1,
   wherein the reference images include the second keyboard played by the reference performer, and
   wherein the display control circuit is configured to display the reference images on the display device such that the second keyboard overlaps the first keyboard shown in the observation images.

4. The information processing system according to claim 1, further comprising a reference identification circuit analyze the observation images to identify a reference position relative to the first keyboard instrument included in the observation images,
   wherein the display control circuit is configured to display the reference images at a position corresponding to the reference position.

5. The information processing system according to claim 4, wherein the reference identification circuit is further configured to detect an end portion of the first keyboard included in the observation images and determine a position of the end portion as the reference position.

6. The information processing system according to claim 4, wherein the reference identification circuit is further configured to detect a mark on the first keyboard instrument included in the observation images and determine a position of the mark as the reference position.

7. The information processing system according to claim 4, wherein the reference identification circuit is further configured to detect an operated key from among a plurality of keys of the first keyboard shown in the observation images, and determine a position of the operated key as the reference position.

8. The information processing system according to claim 1, wherein the display control circuit is further configured to control a numerical value of a transmission parameter of the reference images.

9. The information processing system according to claim 8, further comprising a performance analysis circuit configured to determine whether the first keyboard instrument is being played,
- wherein in a case where it is determined that the first keyboard instrument is not being played, the display control circuit is further configured to set the transmission parameter to a first value, and
- wherein in a case where it is determined that the first keyboard instrument is being played, the display control circuit is further configured to set the transmission parameter to a second value that is higher in transmission degree than the first value.

10. The information processing system according to claim 8,
- wherein in a first motion mode, the display control circuit is further configured to set the transmission parameter to a first value, and
- wherein in a second motion mode, the display control circuit is further configured to set the transmission parameter to a second value that is higher in transmission degree than the first value.

11. The information processing system according to claim 1, further comprising a performance analysis circuit configured to identify an operation position on the first keyboard of the first keyboard instrument,
- wherein the display control circuit is further configured to display the reference images in an area of the first keyboard that is higher or lower in sound than a predetermined area of the keyboard, the predetermined area including the operation position.

12. The information processing system according to claim 1, further comprising a performance analysis circuit configured to identify a performance point in a musical piece,
- wherein the display control circuit is further configured to display, on the display device, a performance-point part of the reference images that correspond to the performance point in the musical piece.

13. The information processing system according to claim 12,
- wherein the performance analysis circuit is further configured to identify a performance speed, and
- wherein the display control circuit is further configured to control a reproduction speed of the reference images based on the performance speed.

14. The information processing system according to claim 1, further comprising a reception control circuit configured to receive, using a communication device, moving image data indicating a motion made by the reference performer,
- wherein the display control circuit is configured to display, on the display device, the reference image indicated by the moving image data.

15. The information processing system according to claim 1, wherein the observation images are obtained from an image pickup device.

16. The information processing system according to claim 15, wherein the image pickup device is mounted on a head of a user of the information processing system.

17. A computer system implemented method of processing information, the method comprising:
- obtaining observation images of a first keyboard of a first keyboard instrument; and
- displaying, on a display device, the observation images and reference images, the reference images including a moving image of at least one hand and one or more fingers of a reference performer who is playing a second keyboard of a second keyboard instrument, such that the at least one hand and the one or more fingers of the reference performer are displayed overlapping the first keyboard included in the observation images.

18. The method according to claim 17, wherein the observation images are obtained from an image pickup device.

19. The method according to claim 18, wherein the image pickup device is mounted on a head of a user of an information processing system.

20. The method according to claim 17,
- wherein the reference images include the second keyboard played by the reference performer, and
- wherein the reference images are displayed on the display device such that the second keyboard overlaps the first keyboard shown in the observation images.

* * * * *